(12) United States Patent
Rodriguez

(10) Patent No.: US 8,919,547 B2
(45) Date of Patent: Dec. 30, 2014

(54) OPTICAL DISC CASE AND METHOD OF MANUFACTURING SAME

(71) Applicant: Disc Graphics, Inc., Hauppauge, NY (US)

(72) Inventor: Felipe Antonio Rodriguez, Brooklyn, NY (US)

(73) Assignee: Disc Graphics, Inc., Hauppauge, NY (US)

( * ) Notice: Subject to any disclaimer, the term of this patent is extended or adjusted under 35 U.S.C. 154(b) by 0 days.

(21) Appl. No.: 13/671,779

(22) Filed: Nov. 8, 2012

(65) Prior Publication Data

US 2013/0118931 A1    May 16, 2013

Related U.S. Application Data

(60) Provisional application No. 61/557,972, filed on Nov. 10, 2011.

(51) Int. Cl.
*B65D 85/30* (2006.01)
*G11B 33/04* (2006.01)

(52) U.S. Cl.
CPC ............ *B65D 85/30* (2013.01); *G11B 33/0494* (2013.01)
USPC ...................................... 206/308.1; 206/312

(58) Field of Classification Search
CPC .......... G11B 33/0433; G11B 33/0444; G11B 33/0494; G11B 33/0422; G11B 33/0427; B65D 85/30; B65D 85/58; B65D 85/546; B65D 85/548; B42F 7/06
USPC .................... 206/308.1, 311, 312, 308.2, 232
See application file for complete search history.

(56) References Cited

U.S. PATENT DOCUMENTS

| | | | | | |
|---|---|---|---|---|---|
| 4,709,812 | A | * | 12/1987 | Kosterka | 206/308.1 |
| 5,188,229 | A | * | 2/1993 | Bernstein | 206/308.1 |
| 5,518,488 | A | * | 5/1996 | Schluger | 493/82 |
| 5,682,990 | A | * | 11/1997 | Schluger | 206/308.1 |
| 5,685,424 | A | * | 11/1997 | Rozek et al. | 206/308.1 |
| 6,092,653 | A | * | 7/2000 | Pozzoli | 206/312 |
| 6,241,085 | B1 | * | 6/2001 | Koehn | 206/308.1 |
| 6,276,523 | B2 | * | 8/2001 | Sanders | 206/308.1 |
| 6,296,112 | B1 | * | 10/2001 | Pettey | 206/232 |
| 6,443,301 | B2 | * | 9/2002 | Garnier | 206/312 |

(Continued)

OTHER PUBLICATIONS

Notification of Transmittal of the International Search Report and the Written Opinion of the International Search Authority, or the Declaration; the International Search Report; and the Written Opinion of the International Searching Authority (in English), dated Jan. 22, 2013, issued from Applicant's corresponding PCT Application No. PCT/EP2012/064073.

*Primary Examiner* — Steven A. Reynolds
(74) *Attorney, Agent, or Firm* — Gerald T. Bodner

(57) ABSTRACT

A case for holding optical discs includes a primary blank formed of foldable material and having at least six interconnected panels. In certain of the panels of the primary blank a U-shaped cutout is formed, and in certain other panels a disc access cutout is formed. The panels are folded to form a folded primary blank. The folded primary blank is joined to an end blank, which is also folded to form a folded end blank, the folded primary blank and the folded end blank being joined together to define a folded composite blank. The folded composite blank is positioned between a front cover and a back cover of a cover piece.

46 Claims, 13 Drawing Sheets

(56) References Cited

U.S. PATENT DOCUMENTS

| | | | |
|---|---|---|---|
| 6,634,495 B2 * | 10/2003 | Hass | 206/312 |
| 7,703,604 B2 * | 4/2010 | Golden et al. | 206/312 |
| 2001/0037951 A1 * | 11/2001 | Garnier | 206/308.1 |
| 2001/0037952 A1 * | 11/2001 | Garnier | 206/308.1 |
| 2002/0056986 A1 * | 5/2002 | Shafer | 281/38 |
| 2008/0047854 A1 * | 2/2008 | Golden et al. | 206/308.1 |
| 2009/0194442 A1 * | 8/2009 | Wynalda et al. | 206/308.1 |
| 2010/0044258 A1 * | 2/2010 | Siecke | 206/308.1 |

* cited by examiner

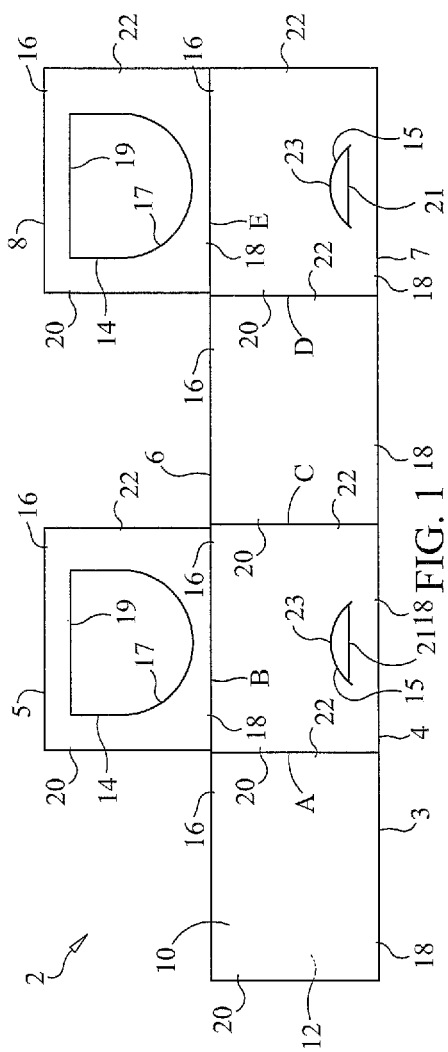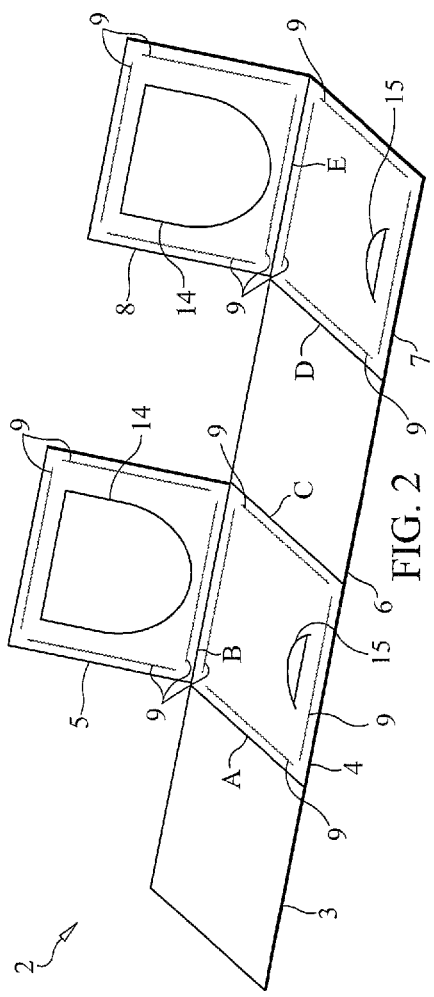

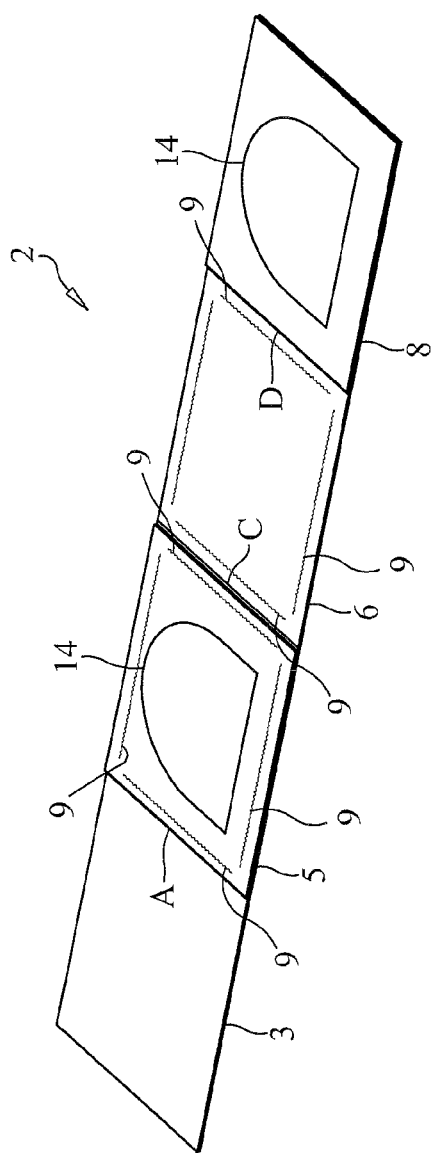
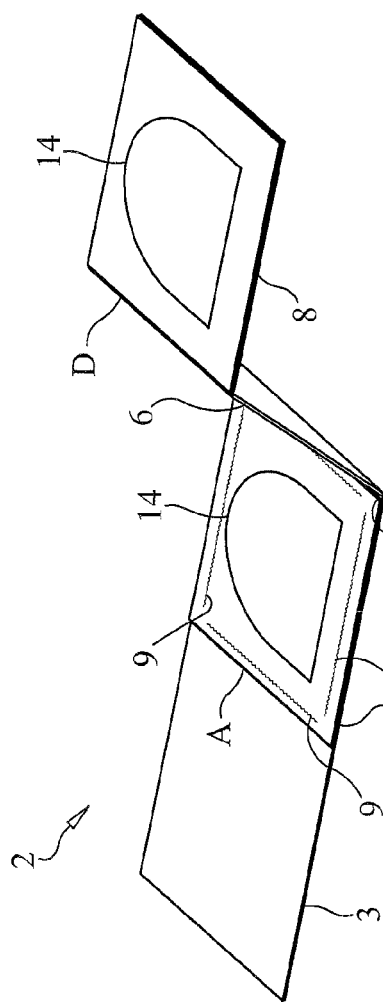
FIG. 3
FIG. 4

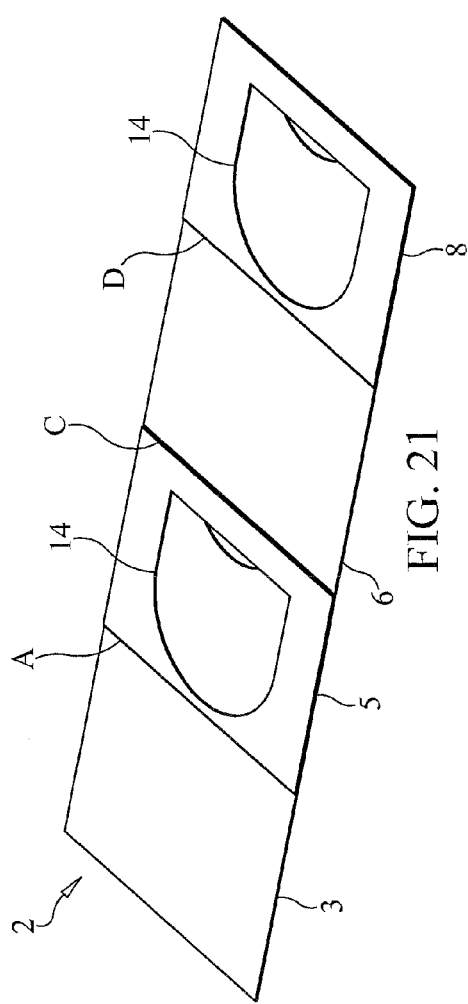
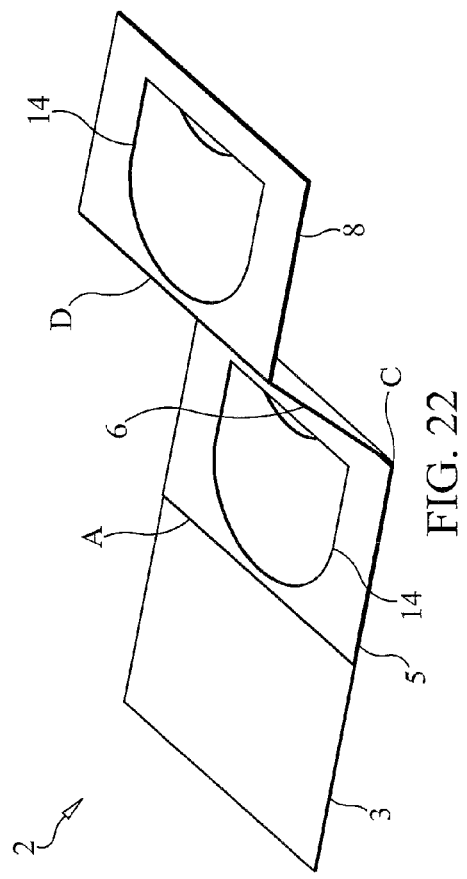

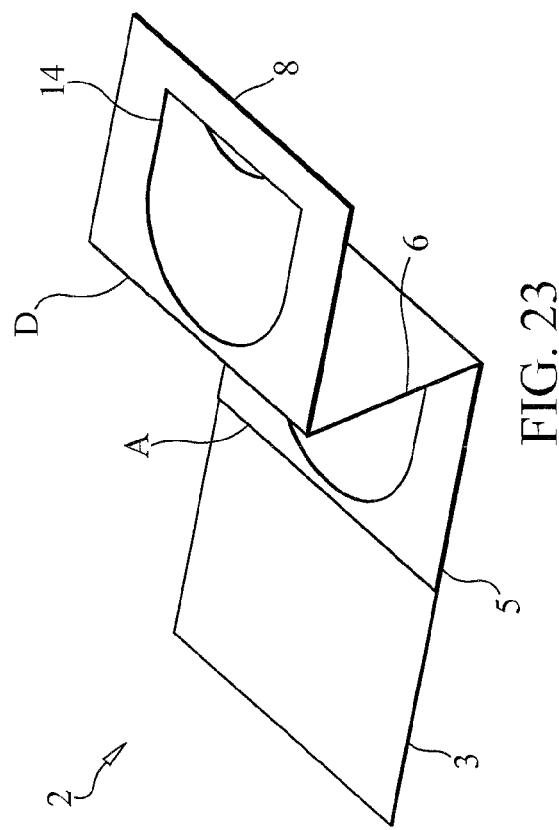
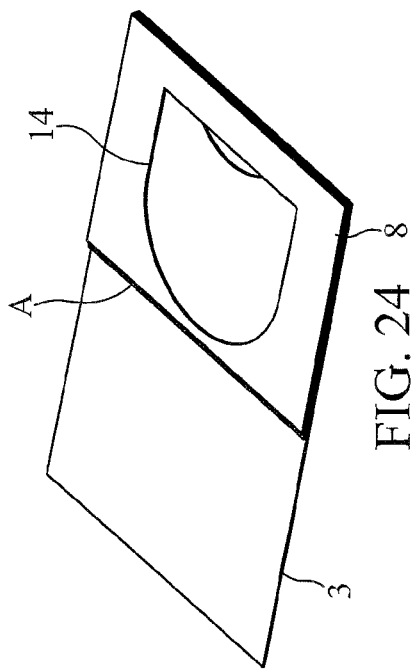
FIG. 23
FIG. 24

OPTICAL DISC CASE AND METHOD OF MANUFACTURING SAME

CROSS-REFERENCE TO RELATED APPLICATIONS

This application is related to U.S. Provisional Application Ser. No. 61/557,972, filed on Nov. 10, 2011, and entitled "Optical Disc Case", the disclosure of which is incorporated herein by reference and on which priority is hereby claimed.

BACKGROUND OF THE INVENTION

1. Field of the Invention

The present invention relates generally to the field of packages for compact discs (CDs), digital video discs (DVDs) and Blu-Ray™ discs (BDs) and a method of package assembly.

2. Description of Prior Art

Optical disc formats, such as compact discs (CDs), Blu-Ray™ optical video discs (BDs) and digital video discs (DVDs), are a popular medium to distribute media, such as music, movies, and computer software. Currently, there are a number of cases for optical discs on the market which purport to offer certain advantages, but still suffer from a number of limitations.

Conventional board optical disc cases or packages contain one or more pockets formed of two relatively stiff, spaced apart paperboard or cardboard side pieces to securely house at least one disc within each pocket. Although designs can vary, the size and shape of the pockets that house optical discs are generally rectangular. The pocket must tightly conform to the size and thickness of the disc to minimize any movement of the disc within the pocket and to hold the disc securely therein. But also, the pocket should maintain a uniform spacing between the side pieces to freely receive the disc and allow the removal thereof without significant effort.

Conventional cases used for holding optical discs utilize paperboard spacers situated on the lateral sides within the pocket to maintain the spacing between the cardboard side pieces. While board spacers succeed in maintaining this necessary spacing, they are made of a separate substrate from the side pieces that form the pocket, and this fact adds to the manufacturing costs of the optical disc case. The board spacers are separate and distinct from the side pieces that define each optical disc pocket. As a result, their inclusion requires that they be carefully positioned and adhesively joined to the side pieces within the pocket, which complicates the hand assembly process. The spacers need to be properly sized and cut to fit each individual pocket.

OBJECTS AND SUMMARY OF THE INVENTION

It is an object of the present invention to provide an improved optical disc case wherein each pocket and spacer is assembled from a single, foldable blank of cardboard, hardboard, or other paper-like material, or synthetic material.

It is another object of the present invention to provide an improved optical disc case which is cost effective to manufacture.

It is still another object of the present invention to provide an improved optical disc case which is easy to assemble.

It is yet another object of the present invention to provide a method of manufacturing an optical disc case from a foldable blank of material.

It is a further object of the present invention to provide an improved optical disc case which overcomes the inherent disadvantages of conventional optical disc cases.

In accordance with one form of the present invention, a case for holding optical discs includes a package blank having a plurality of panels which fold onto one another to form a pocket or multiple pockets to hold an optical disc. The folded blank also defines spacers that maintain a predetermined separation between the adjacent panels defining the pocket. Since a single package blank is used to form the pocket or pockets, the assembly process of the optical disc case is simplified and takes less time and may be carried out at a lower cost than for conventional optical disc cases.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 1 is a front elevational view of an untrimmed package blank formed in accordance with a first embodiment of the present invention and used to form a top loading optical disc case of the present invention.

FIG. 2 is a perspective view of the untrimmed package blank of the first embodiment of the present invention shown in a first partially folded state.

FIG. 3 is a perspective view of the untrimmed package blank of the first embodiment of the present invention shown in a second partially folded state.

FIG. 4 a perspective view of the untrimmed package blank of the first embodiment of the present invention shown in a third partially folded state.

FIG. 21 is a perspective view of the untrimmed package blank of the second embodiment of the present invention shown in FIG. 19 in a second partially folded state.

FIG. 22 is a perspective view of the untrimmed package blank of the second embodiment of the present invention shown in FIG. 19 in a third partially folded state.

FIG. 23 is a perspective view of the untrimmed package blank of the second embodiment of the present invention shown in FIG. 19 in a fourth partially folded state.

FIG. 24 is a perspective view of the untrimmed package blank of the second embodiment of the present invention shown in FIG. 19 in a fifth partially folded state.

DETAILED DESCRIPTION OF THE PREFERRED EMBODIMENTS

Figure 5:
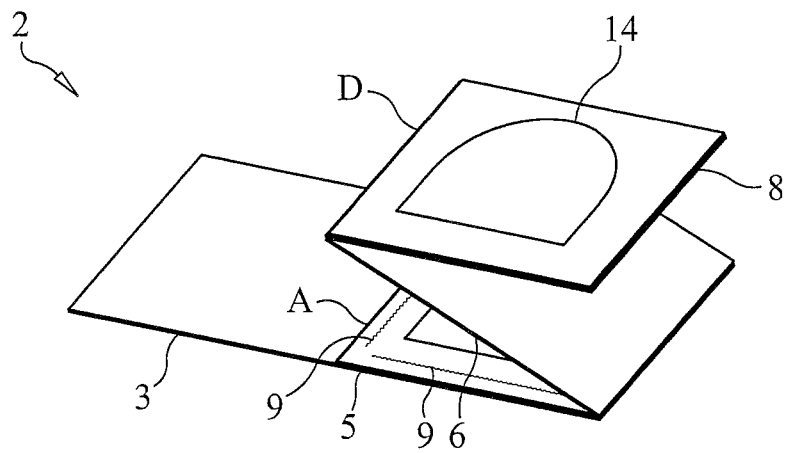
FIG. 5 a perspective view of the untrimmed package blank of the first embodiment of the present invention shown in a fourth partially folded state.

A CD, DVD or BD case constructed in accordance with the present invention is formed from one or more unitary package blanks 2 that may be joined together. The blank 2 is formed from a plurality of rectangular panels, adjacent panels being joined together at score or fold lines.

FIGS. 1-7 relate to a package blank constructed in accordance with a first embodiment of the present invention for forming the top loading optical disc case of the present invention. As shown in FIG. 1, the package blank 2 preferably has a first panel 3, second panel 4, third panel 5, fourth panel 6, fifth panel 7, and sixth panel 8. When viewing the blank 2 shown in FIG. 1, it will be seen that the first panel 3 is joined at its right side to the left side of the second panel 4 along score line A. The second panel 4 is joined, again with reference to FIG. 1, at its top side to the bottom side of the third panel 5 along score line B. The second panel 4 is also joined at its right side to the left side of the fourth panel 6 along score line C. The fourth panel 6, is joined at its right side to the left side of the fifth panel 7 along score line D. Furthermore, the fifth panel 7 is joined at its top side to the bottom side of the sixth panel 8 along score line E. Thus, the preferred form of the blank 2 is formed from the interconnected panels 3-8 along score lines A-E, as described above.

Each of the third and sixth panels 5, 8 are further defined by a U-shaped cut 14 formed through the thickness of these panels, each cut 14 being centered on a respective panel 5, 8. In a preferred embodiment, the curved portion of the cut 14 formed in each of the third panel 5 and sixth panel 8 is adjacent to and faces score line B and score line E, respectively.

The top of each cut 14, i.e. the straight line portion, when the blank 2 is viewed in FIG. 1, remains joined at this stage to the panel 5, 8 in which it is formed at the top side of each panel 5, 8. As will be seen, the cuts 14 are provided to define together with adjacent panels a pocket for receiving a CD, DVD or BD. Each U-shaped cut 14 is dimensioned to receive and removably secure an optical disc, such as a CD, DVD or BD, therein.

Furthermore, each of the second and fifth panels 4, 7 of the blank 2 is defined with a partial hemispherical cut 15 (sometimes referred to as a "thumb cut") formed through the thickness of these panels, each cut 15 being situated at a lower portion of each respective panel 4, 7, when viewing the blank 2 in FIG. 1. The curved portion of the partial hemispherical cut 15 formed in each of the second panel 4 and fifth panel 7 is oriented to face score line B and score line E, respectively. The straight line bottom of each partial hemispherical cut 15, when the blank 2 is viewed in FIG. 1, remains joined at this stage to the panel 4, 7 in which it is formed at the bottom side of each panel 4, 7. The partial hemispherical cut 15 is sized to partially expose a CD, DVD or BD received by the pockets of the assembled case so that a user can easily grasp an edge of the CD, DVD or BD and remove it from a respective pocket.

FIGS. 2-6 of the drawings illustrate the sequence of steps in forming one or more pockets from the blank 2 used in constructing the CD, DVD or BD case of the present invention. First, an adhesive 9 is applied to the side portions of either the second panel 4 or the third panel 5, on the front surfaces thereof, and either the fifth panel 7 or the sixth panel 8, on the front surfaces thereof. More specifically, and when viewing the blank 2 shown in FIG. 1, the adhesive 9 may be applied to the left and right side portions of either the second panel 4 or the third panel 5, on the front surfaces thereof, and either the fifth panel 7 or the sixth panel 8, on the front surfaces thereof, or the top and bottom side portions of either the second panel 4 or the third panel 5, on the front surfaces thereof, and either the fifth panel 7 or the sixth panel 8, on the front surfaces thereof, or all four side portions of either the second panel 4 or the third panel 5, on the front surfaces thereof, and either the fifth panel 7 or sixth panel 8, on the front surfaces thereof. The purpose of the adhesive 9 is to secure the second and third panels 4, 5 together and the fifth and sixth panels 7, 8 together.

Then, as shown in FIGS. 2 and 3, the third panel 5 is folded over the second panel 4 at the score line B so that the third panel 5 overlies and is adhesively joined to the second panel 4. Similarly, the sixth panel 8 is folded over the fifth panel 7 at the score line E so that the sixth panel 8 overlies and is adhesively joined to the fifth panel 7. The result of these steps creates a partially folded, elongated blank 2 having a constant height along the length thereof, as shown in FIG. 3.

Adhesive 9 is also applied to the side portions of the back surface of the third panel 5 (which is already affixed to the second panel 4) or the side portions of the front surface of the fourth panel 6. More specifically, and when viewing the layout of the blank 2 shown in FIG. 1, the adhesive 9 may be applied to the left and right side portions of the third panel 5, on the back surface thereof, or the left and right side portions of the fourth panel 6, on the front surface thereof. Alternatively, the adhesive 9 may be applied to the top and bottom side portions of the third panel 5, on the back surface thereof, or the top and bottom side portions of the fourth panel 6, on the front surface thereof. Or, the adhesive 9 may be applied to all four side portions of the third panel 5, on the back surface thereof, or all four side portions of the fourth panel 6, on the front surface thereof.

Figure 6:
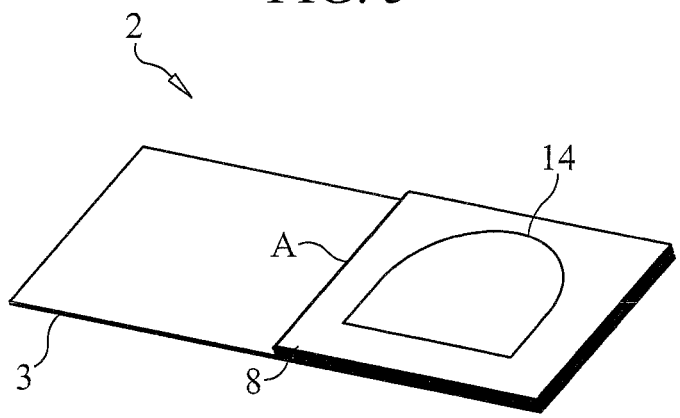
FIG. 6 is a perspective view of the untrimmed package blank of the first embodiment of the present invention shown in a fifth partially folded state.

The next step is to fold the elongated blank 2 at score line C and score line D as shown in FIGS. 4 and 5 so that the fourth panel 6 overlies the third panel 5 (already folded onto the second panel 4) such that the front surface of the fourth panel 6 is adhesively joined to the back surface of the third panel 5, the result being a folded blank 2 having a two panel length as shown in FIG. 6.

Figure 7:
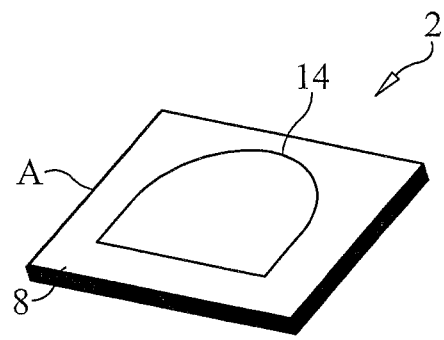
FIG. 7 is a perspective view of the untrimmed package blank of the first embodiment of the present invention shown in a fully folded state.

The fully folded blank 2 is formed by folding the first panel 3 under the sixth panel 8 (in close proximity to the back surface of the second panel 4), as shown in FIG. 7 of the drawings.

As will be seen from the drawings and a further explanation provided below, a pocket will be formed between the second panel 4 and fourth panel 6, with the third panel 5 sandwiched therebetween.

The folded blank 2 shown in FIG. 7 may be joined to other blanks 2 folded in the same manner as described above. More specifically, the first panel 3 of a second blank 2 may be adhesively joined to the back surface of the sixth panel 8 of the first blank 2 to form additional pockets for receiving respective CDs, DVDs or BDs. Alternatively, a single package blank 2 can also be manufactured with additional panels, so long as the panels maintain an equivalent orientation and score lines as the preferred embodiment described herein.

Figure 8:
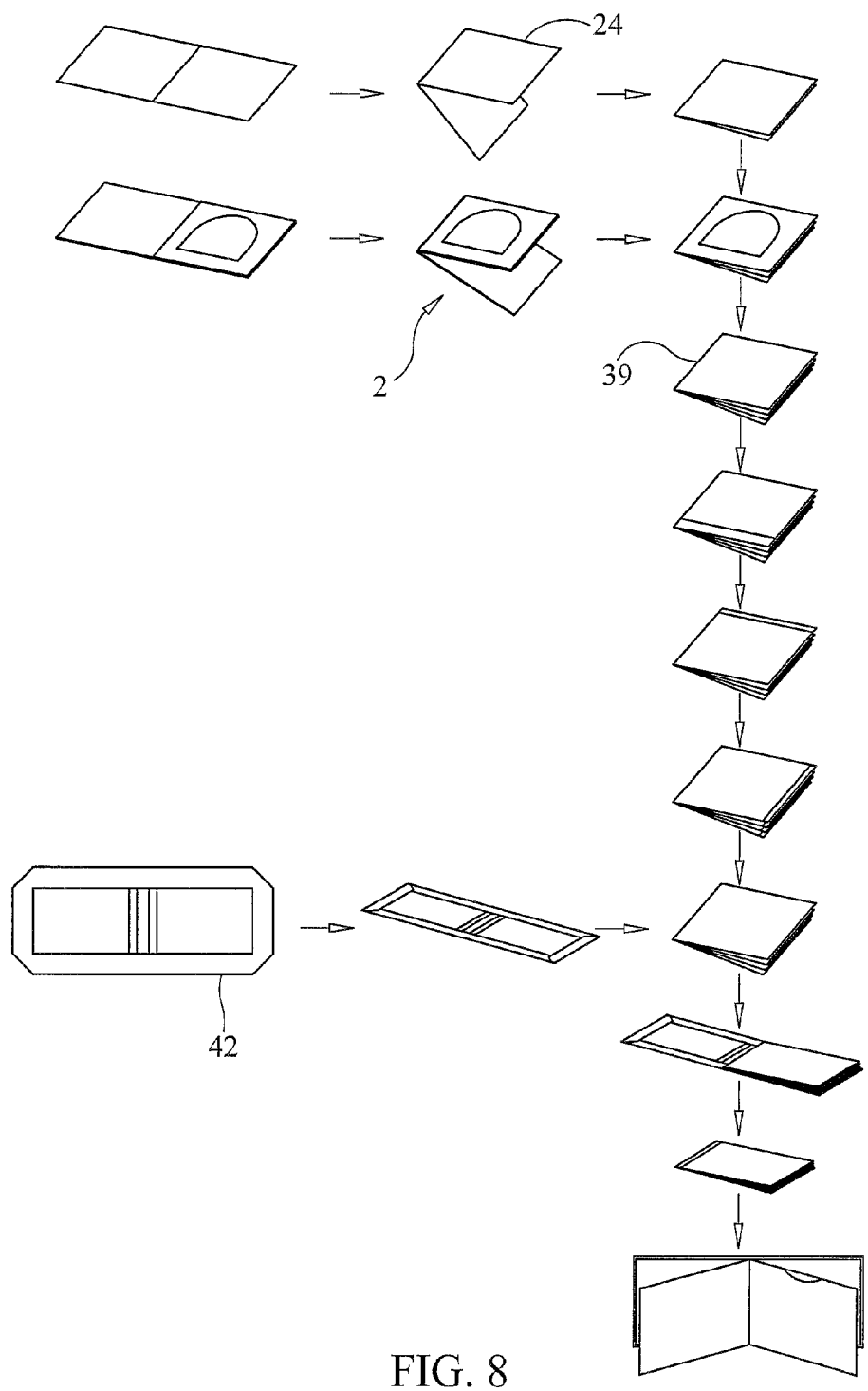
FIG. 8 is a pictorial illustration of the sequence of steps used in the formation of the optical disc case of the present invention.

With reference to FIG. 8, an entire optical disc package is shown being formed in a sequence of steps. These steps are also shown as enlarged drawings in FIGS. 9-18.

Figure 9:
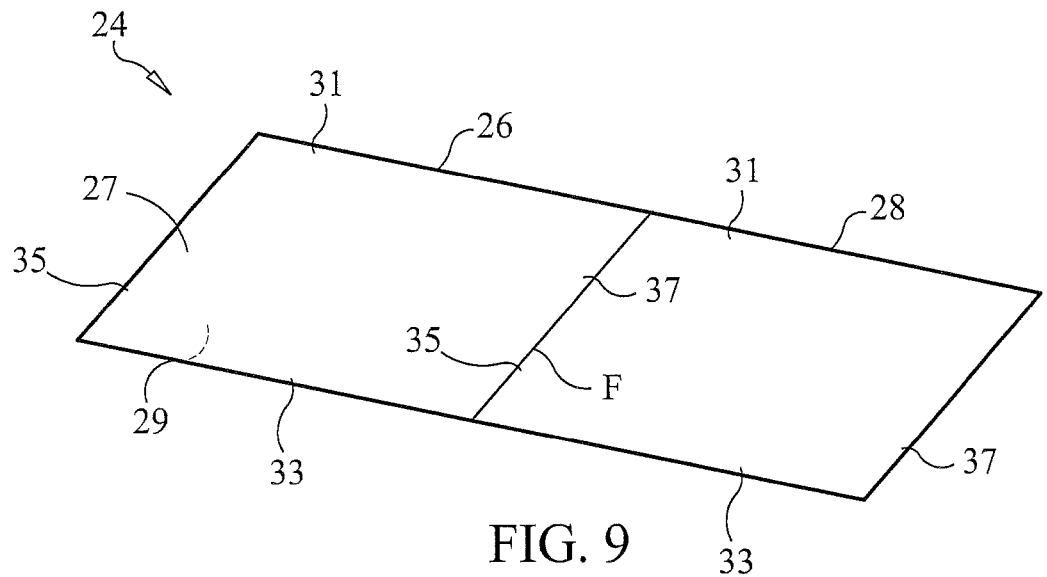
FIG. 9 is a perspective view of the untrimmed end blank of the present invention.
Figure 10:
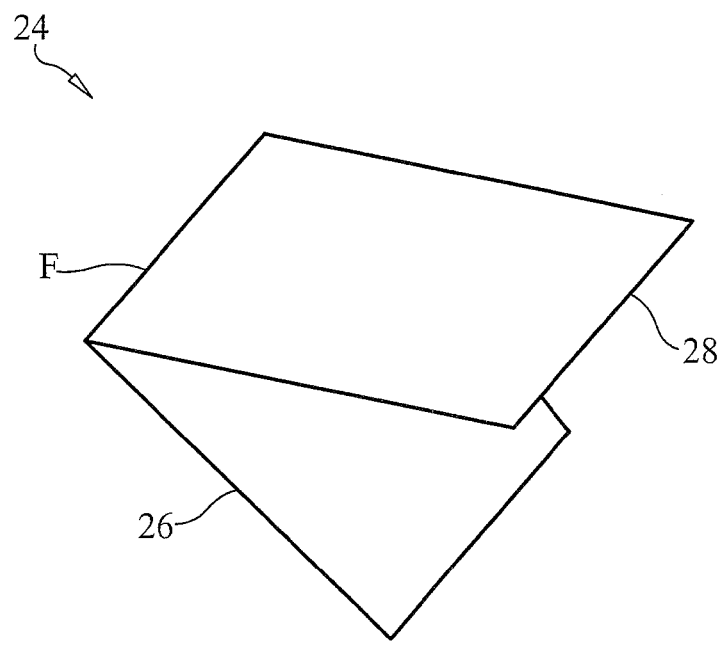
FIG. 10 is a perspective view of the untrimmed end blank of the present invention shown in FIG. 9 in a partially folded state.

As shown in FIGS. 8-10, the folded blank 2 shown in FIG. 7 may be adhesively joined to an end blank 24. Once adhesively joined to the folded blank 2, the end blank 24 can provide an additional panel to form a pocket for receiving respective CDs, DVDs or BDs with at least a second folded blank 2, or provide an additional panel to adhesively join the folded blank 2 to a rigid or soft cover piece 42 to form the optical disc case of the present invention. The end blank 24 has only a first panel 26 and a second panel 28. When viewing the end blank 24 shown in FIG. 9, it will be seen that the first panel 26 is joined at its right side to the left side of the second panel 28 along score line F.

Figure 11:
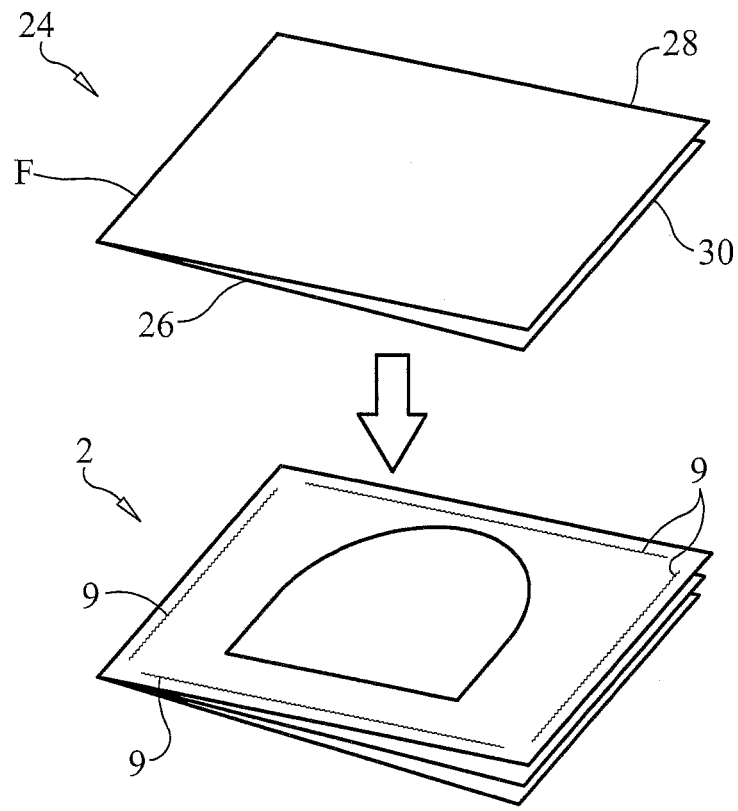
FIG. 11 a perspective view of the untrimmed package blank of the first embodiment and the untrimmed end blank of the present invention, each in a fully folded state.

Referring now to FIGS. 8 and 10, the end blank 24 is folded at score line F so that the first panel 26 of the end blank 24 underlies the second panel 28 to form a fully folded end blank 24, as shown in FIGS. 8 and 11. Then, an adhesive 9 may be applied to either or both of the sixth panel 8 of the folded blank 2 and the first panel 26 of the end blank 24. More specifically, the adhesive 9 may be applied to any or all of the side portions surrounding the U-shaped cut 14 (e.g. the left, right, top, and bottom sides) on the back surface of the sixth panel 8 of the folded blank 2 or the front surface 30 of the first panel 26 of the end blank 24. Now, the end blank 24 is joined to the folded blank 2, as shown in FIGS. 8 and 12.

Figure 12:
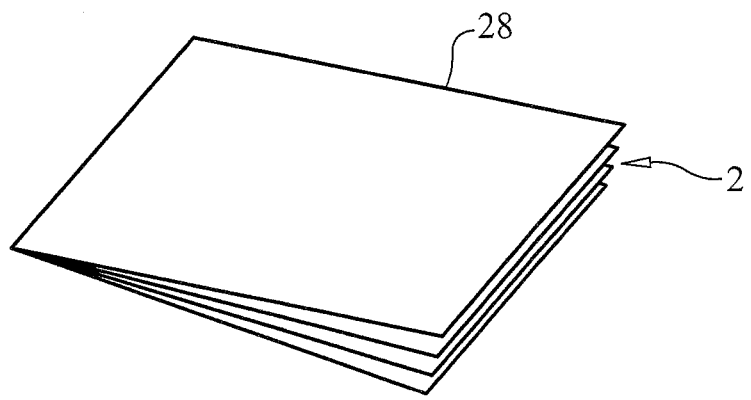
FIG. 12 is a perspective view of the untrimmed end blank adhesively joined to the untrimmed package blank of the present invention.
Figure 13:
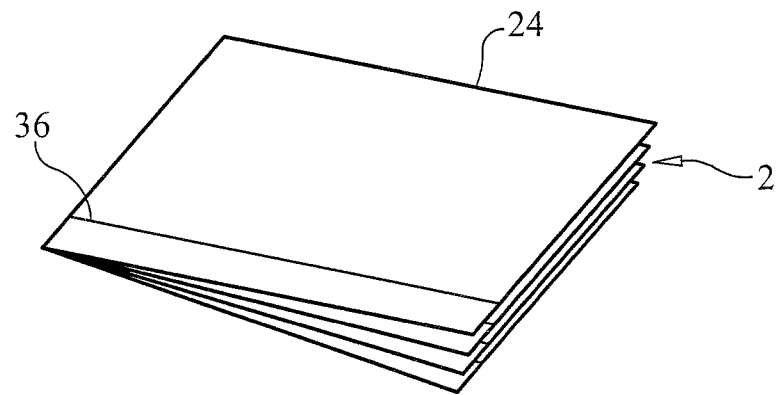
FIG. 13 is a perspective view of the untrimmed end blank adhesively joined to the untrimmed package blank of the present invention and illustrating a first trim line along which the joined together blanks are trimmed.

The folded blank 2 shown in FIG. 12, with the end blank 24 attached, is now trimmed on its edges. More specifically, and with reference to the orientation of the folded blank 2 with the end blank 24 attached shown in FIG. 13, the bottom edge portion of the composite folded blank formed from blanks 2, 24 is trimmed at cut line 36 situated at a predetermined distance from the bottom edge that is sufficient to remove that portion of the third panel 5 and the sixth panel 8 which holds the U-shaped cuts 14 in place so that the U-shaped cut portions may be removed from their respective panels. The trimming of this bottom edge is referred to as a "head trim", since the trimmed bottom edge of the composite blank shown in FIGS. 8 and 13 will constitute the top side of the finished optical disk package from which side the optical disks are removed. The unremoved portions of the third and sixth panels 5, 8 define the spacers situated between the second and fourth panels 4, 6, and the fifth panel 7 and the first panel 3 of a second blank 2 or the end blank 24 joined to the first blank 2. Trimming the bottom edge of the composite folded blank shown in FIG. 13 also allows for the removal of the partial hemispherical cut portions 15 from the second and fifth panels 4, 7 of the blank 2.

Although it is described herein that trimming of the bottom edge of the composite folded blank conveniently allows removal of the U-shaped cut portions 14 and partial hemispherical cut portions 15, it should be understood that these cutout portions 14, 15 may be removed by die cutting when the blank 2 is formed, in accordance with the present invention.

Figure 14:
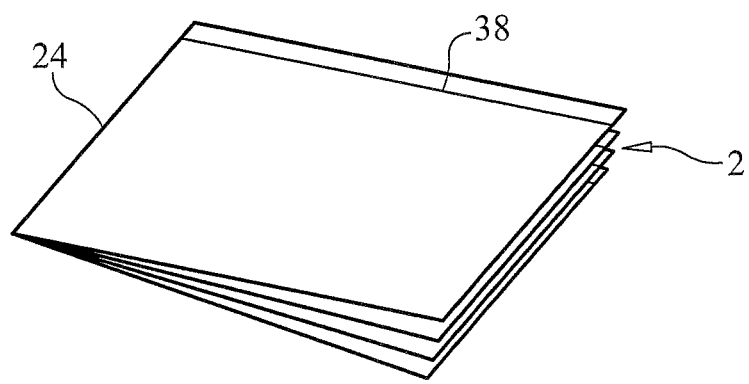
FIG. 14 is a perspective view of the end blank adhesively joined to the package blank of the present invention in a first partially trimmed state and illustrating a second trim line along which the joined together blanks are trimmed.

The next step is to trim the top edge portion of the composite folded blank (formed from blank 2 and end blank 24), oriented as shown in FIGS. 8 and 14, at cut line 38 situated at a predetermined distance from the top edge of the composite blank that is sufficient to remove a top portion of the composite blank, as shown in FIGS. 8 and 14, but not so much as to cut into the U-shaped cutouts 14 formed in the third and sixth panels 5, 8. The trimming of this top edge is referred to as a "foot trim", since the trimmed top edge of the composite blank shown in FIGS. 8 and 14 will constitute the bottom side of the finished optical disk package.

Figure 15:
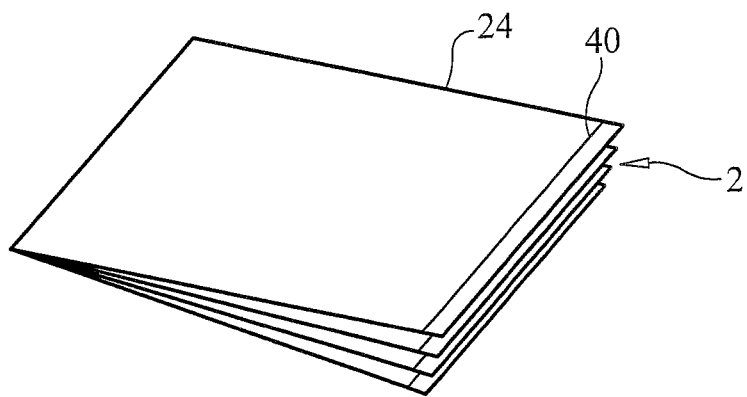
FIG. 15 is a perspective view of the end blank adhesively joined to the package blank of the present invention in a second partially trimmed state and illustrating a third trim line along which the joined together blanks are trimmed.

Referring to FIGS. 8 and 15, the lateral edge portion of the composite folded blank (formed from blank 2 and end blank 24) is also trimmed at cut line 40 situated at a predetermined distance from the lateral edge of the composite blank that is sufficient to remove a portion of the composite blank, as shown in FIGS. 8 and 15, but not so much as to cut into the U-shaped cutouts 14 formed in the third and sixth panels 5, 8. The trimming of the lateral edge is referred to as a "face trim". This trimmed lateral edge will form the free ends of the pockets of the optical disc case of the present invention, and the opposite (untrimmed) lateral edge will form the binding of the optical disc case. Although the sequence of trimming is described herein as being in the order of a "head trim", "foot trim", and "face trim", it is envisioned to be within the scope of the present invention to trim the composite blank in any sequence.

Figure 16:
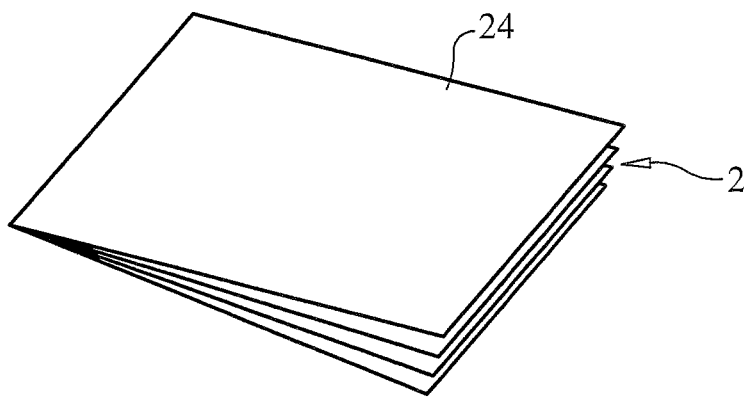
FIG. 16 is a perspective view of the end blank adhesively joined to the package blank of the present invention in a fully trimmed state.
Figure 17:
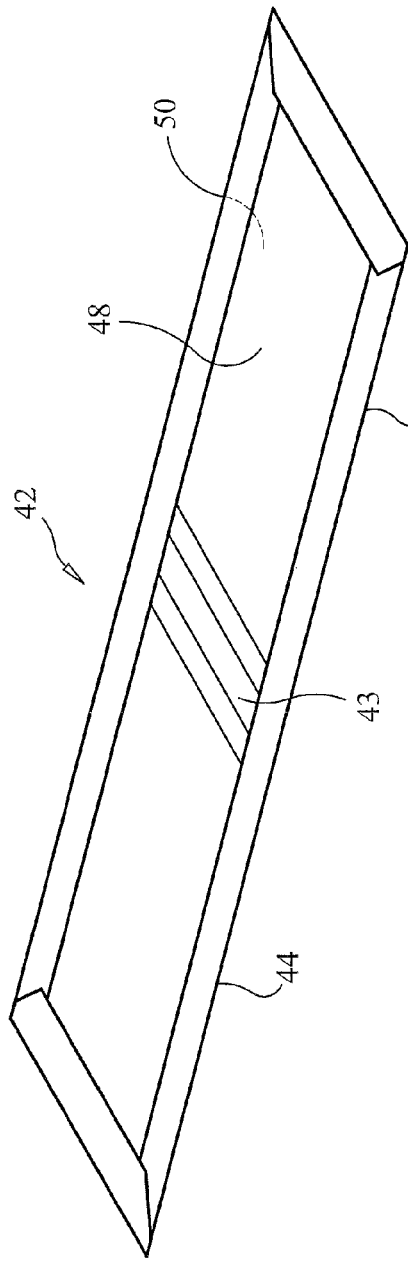
FIG. 17 is a perspective view of a cover piece of the present invention.
Figure 18:
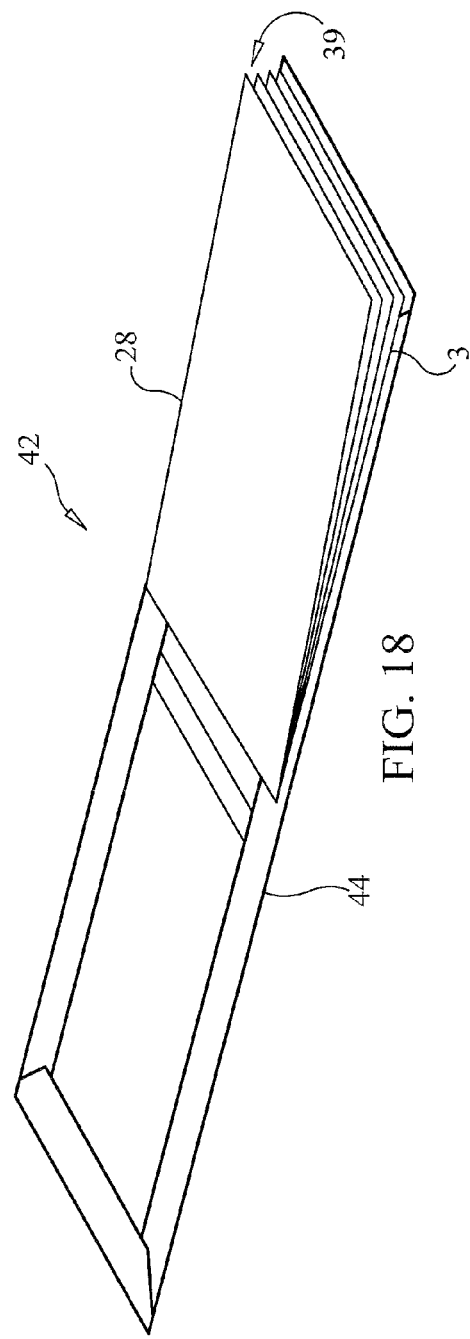
FIG. 18 is a perspective view of the cover piece of the present invention adhesively joined to the end blank and package blank in a fully trimmed state.

The folded and trimmed composite blank, as shown in FIGS. 8 and 16, may be joined to other folded and trimmed composite blanks, as mentioned previously, or other end blanks 24, and the joined together blanks may be secured to a rigid or soft cover piece 42. The cover piece 42 is shown in FIGS. 8 and 17-18 of the drawings. It should be understood that the description to follow of assembling the optical disc case or package using the cover piece 42 is in accordance with a preferred method of the present invention, and that other alternative methods of forming the optical disc case or package using a different cover piece than that shown are envisioned to also be within the scope of the present invention.

More specifically, the cover piece 42 has a stiff (or soft) paperboard core (or is formed from another material, including plastic) and includes a center spine 43 where the cover piece 42 may be folded in half to define a back cover 44 and front cover 46. As shown in FIG. 18, the composite blank is received within the folded cover piece 42 between the back cover 44 and front cover 46. The composite blank is joined to the back and front covers 44, 46 by adhesively joining the exposed surface of the first panel 3 of a folded blank 2 forming the composite blank to the inside surface of one of the back and front covers 44, 46, and by adhesively joining the exposed surface of the second panel 28 of an end blank 24 forming the composite blank to the other of the back and front covers 44, 46, as illustrated by FIGS. 8 and 18 of the drawings. The finished optical disk package formed in accordance with the present invention is shown oriented right-side up in FIG. 8 at the end of the assembly sequence illustrated therein.

Figure 19:
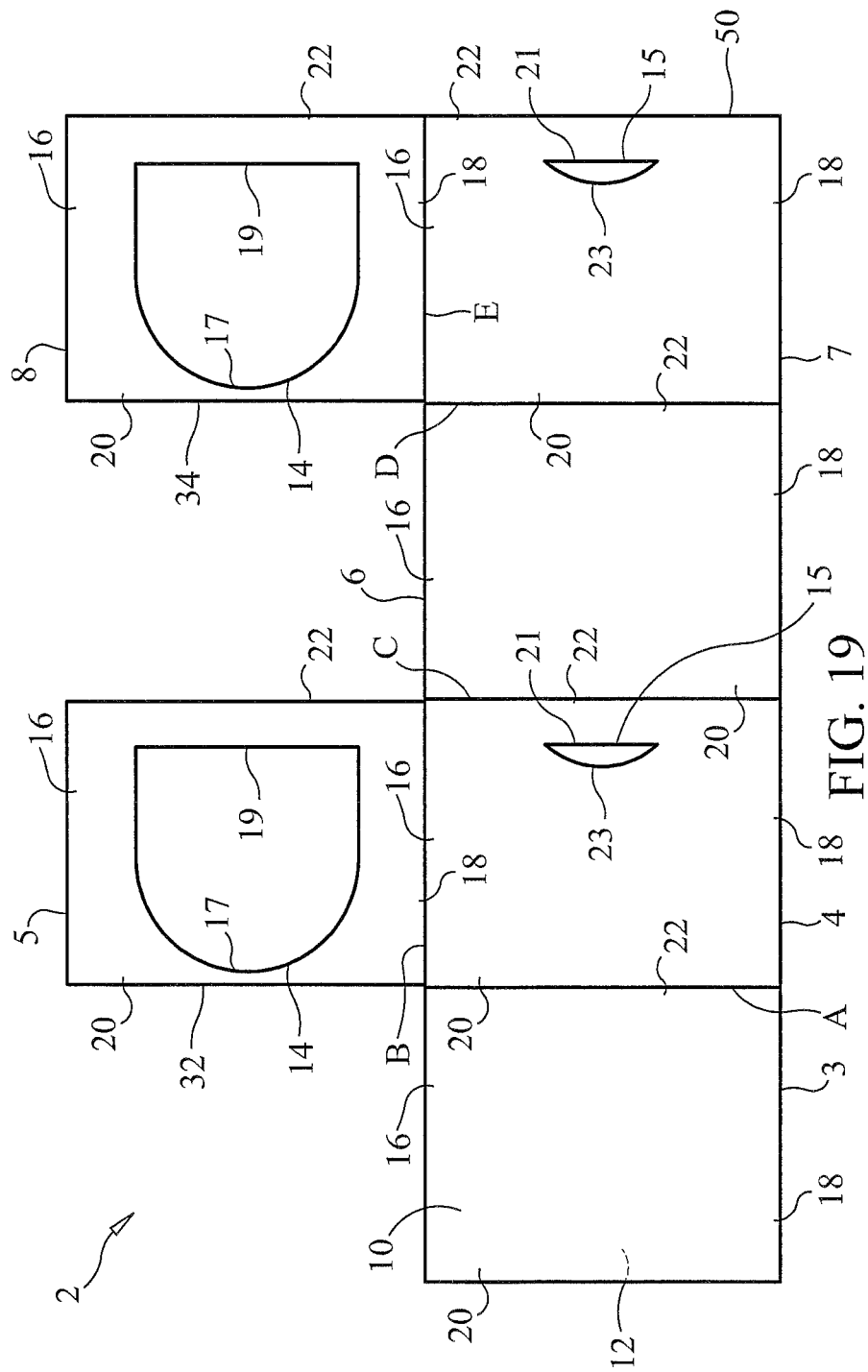
FIG. 19 is a front elevational view of an untrimmed package blank formed in accordance with a second embodiment of the present invention and used to form a side loading optical disc case of the present invention.
Figure 20:
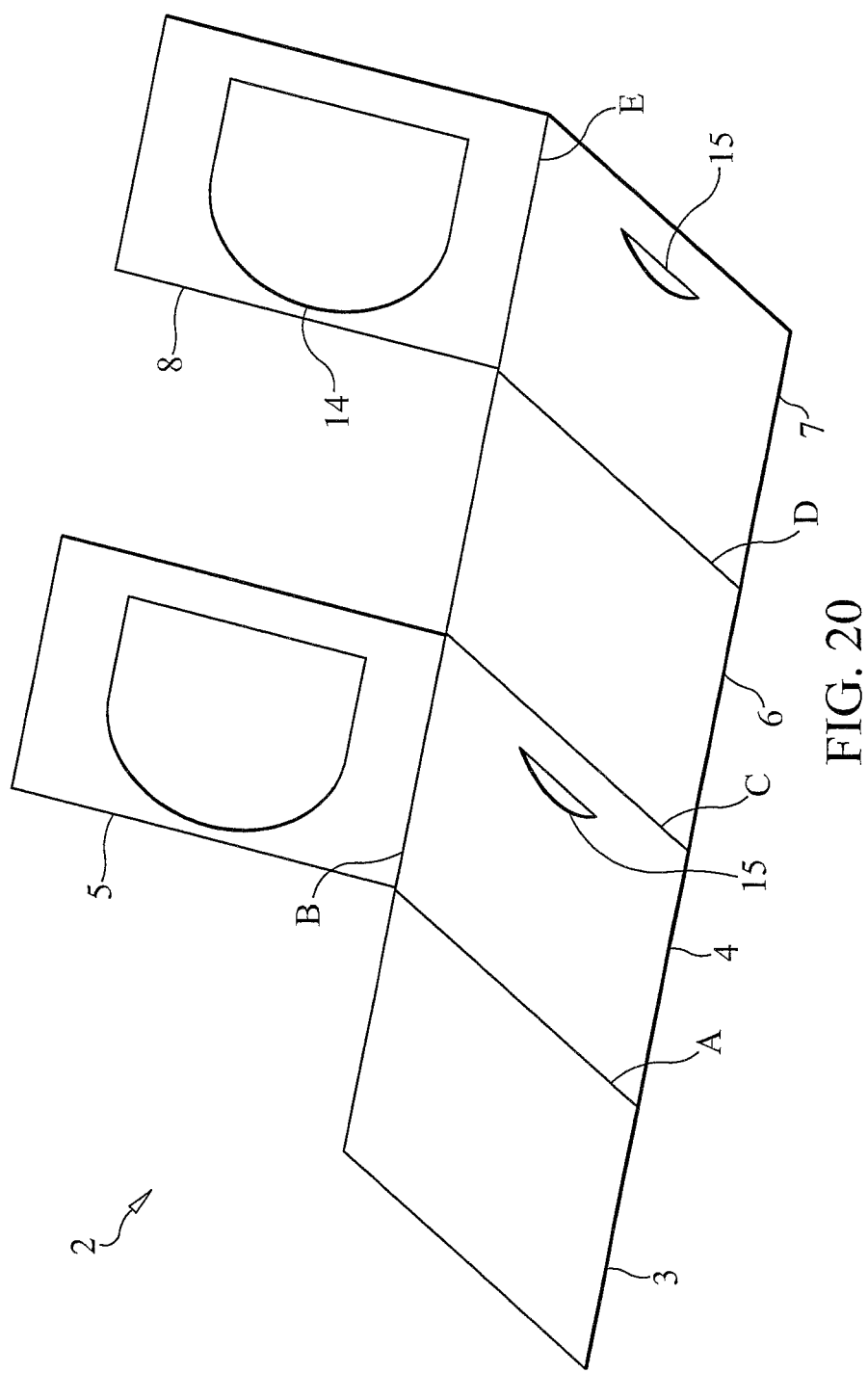
FIG. 20 is a perspective view of the untrimmed package blank of the second embodiment of the present invention shown in FIG. 19 in a first partially folded state.

FIGS. 19-24 illustrate a second embodiment of the package blank 2 of the present invention, which is used for forming the side loading optical disc case of the present invention. As in the embodiment described previously and shown in FIG. 1, the package blank of the second embodiment also includes the same plurality of rectangular panels (i.e., the first through sixth panels 3-8) that are found in the first embodiment of the package blank shown in FIGS. 1-7, and like numbers used herein refer to the same or similar parts. This second embodiment also has the score or fold lines A-E as the first embodiment, and also includes a U-shaped cut 14 formed through the thickness of each of the third and sixth panels 5, 8, and a partial hemispherical cut 15 formed through the thickness of each of the second and fifth panels 4, 7. However, in this second embodiment of the package blank, the U-shaped cut 14 formed in each of the third and sixth panels 5, 8 is orientated 90 degrees from the cut 14 in the first embodiment so that the curved portion of the U-shaped cut 14 formed in each of the third and sixth panels 5, 8 is adjacent to the free edge 32 and free edge 34, respectively, of these panels. Additionally, the partial hemispherical cuts 15 are oriented 90 degrees from the cuts 15 in the first embodiment, and are situated on each of the second and fifth panels 4, 7 so that their curved portions face score lines A and D, respectively, as shown in FIG. 19, with the straight portions of the hemispherical cuts 15 being situated in parallel to the score line C and the right free edge 50 (when viewing FIG. 19) of the fifth panel 7, respectively. In the exemplary embodiment of the blank 2 shown in FIGS. 19-24, the portions of the blank defined by the U-shaped cuts 14 and the partial hemispherical cuts 15 are removed by die cutting when the blank 2 is formed; however, it should be understood that these portions may be removed later by trimming which, in such a situation, the straight portions of cuts 14, 15 at this stage would remain joined to the panels 5, 8 in which they are formed.

The blank 2 for the side loading optical disc case is folded in the same manner as described previously and shown in FIGS. 1-7 with respect to the blank 2 for the top loading case and forms a plurality of pockets in the same manner as described previously to hold optical discs therein. Furthermore, the optical disc case, having a side loading capability, is formed in the same manner as described previously and shown in FIGS. 8-18. If, in this second embodiment, the portions of the blank 2 defined by the cuts 14, 15 are not removed when the blank 2 is formed, then, because the U-shaped cuts 14 and the partial hemispherical cuts 15 are oriented differently from the cuts 14, 15 in the first embodiment, it may be desirable to perform a face trim first in order to remove the pieces defined by cuts 14, 15 prior to performing the head trim and foot trim, although, again, it is envisioned that any sequence of trimming may be suitable in constructing the optical case.

The features of the optical disc case of the present invention and method of making the optical disc case in accordance with the present invention will now again be described with particularity.

In accordance with one form of the present invention, an optical disc case includes a primary blank 2 formed of foldable material having at least six interconnected panels including a first panel 3, a second panel 4, a third panel 5, a fourth panel 6, a fifth panel 7 and a sixth panel 8. Each of the first panel 3, second panel 4, third panel 5, fourth panel 6, fifth panel 7 and sixth panel 8 of the primary blank 2 has a front surface 10 and a rear surface 12 situated opposite the front surface 10, and further has a first edge portion 16, a second edge portion 18 disposed opposite the first edge portion 16, a third edge portion 20 joined to the first and second edge portions 16, 18 and extending therebetween, and a fourth edge portion 22 disposed opposite the third edge portion 20 and joined to the first and second edge portions 16, 18 and extending therebetween.

The fourth edge portion 22 of the first panel 3 is joined to the third edge portion 20 of the second panel 4 at a first fold juncture A, the first and second panels 3, 4 being foldable relative to each other along the first fold juncture A. The first edge portion 16 of the second panel 4 is joined to the second edge portion 18 of the third panel 5 at a second fold juncture B, the second and third panels 4, 5 being foldable relative to each other along the second fold juncture B. The fourth edge portion 22 of the second panel 4 is joined to the third edge portion 20 of the fourth panel 6 at a third fold juncture C, the second and fourth panels 4, 6 being foldable relative to each other along the third fold juncture C. The fourth edge portion 22 of the fourth panel 6 is joined to the third edge portion 20 of the fifth panel 7 at a fourth fold juncture D, the fourth and fifth panels 6, 7 being foldable relative to each other along the fourth fold juncture D. The first edge portion 16 of the fifth panel 7 is joined to the second edge portion 18 of the sixth panel 8 at a fifth fold juncture E, the fifth and sixth panels 7, 8 being foldable relative to each other along the fifth fold juncture E.

The third panel 5 includes a first U-shaped cutout portion 14 formed therein, and a peripheral area 30 at least partially surrounding the first U-shaped cutout portion 14. Similarly, the sixth panel 8 includes a second U-shaped cutout portion 14 formed therein, and a peripheral area 30 at least partially surrounding the second U-shaped cutout portion 14.

The second and third panels 4, 5 are folded relative to each other along the second fold juncture B such that the front surface 10 of the second panel 4 is in close proximity to and faces the front surface 10 of the third panel 5. The fifth and sixth panels 7, 8 are folded relative to each other along the fifth fold juncture E such that the front surface 10 of the fifth panel 7 is in close proximity to and faces the front surface 10 of the sixth panel 8. The second and fourth panels 4, 6 are folded relative to each other along the third fold juncture C such that the front surface 10 of the fourth panel 6 is in close proximity to and faces the rear surface 12 of the third panel 5 folded in close proximity to the second panel 4. The fourth and fifth panels 6, 7 are folded relative to each other along the fourth fold juncture D such that the rear surface 12 of the fifth panel 7 is in close proximity to and faces the rear surface 12 of the fourth panel 6. Finally, the first and second panels 3, 4 are folded relative to each other along the first fold juncture A such that the rear surface 12 of the first panel 3 is in close proximity to and faces the rear surface 12 of the second panel 4 to define a folded primary blank 2.

Preferably, the first and second U-shaped cutout portions 14, 14 are removable from the third and sixth panels 5, 8, respectively, to define openings for receiving at least partially therein respective optical discs. Even more preferably, the peripheral area 30 of the third panel 5 defines a spacer situated between the second panel 4 and the fourth panel 6. The first U-shaped cutout portion 14 is removable from the third panel 5 to define an opening for receiving at least partially therein an optical disc, the opening being at least partially surrounded by the peripheral area 30 of the third panel 5 defining the spacer.

In a preferred form of the optical disc case of the present invention, each of the first and second U-shaped cutout portions 14, 14 includes a curved side 17 and a straight side 19 disposed opposite the curved side 17. The curved side 17 of the first U-shaped cutout portion 14 is oriented in the third panel 5 to be closer to the second edge portion 18 of the third panel 5 and the second fold juncture B than the straight side 19 of the first U-shaped cutout portion 14, and the straight side 19 of the first U-shaped cutout portion 14 is oriented in the third panel 5 to be closer to the first edge portion 16 of the third panel 5 than the curved side 17 of the first U-shaped cutout portion 14. Furthermore, the curved side 17 of the second U-shaped cutout portion 14 is oriented in the sixth panel 8 to be closer to the second edge portion 18 of the sixth panel 8 and fifth fold juncture E than the straight side 19 of the second U-shaped cutout portion 14, and the straight side 19 of the second U-shaped cutout portion 14 is oriented in the sixth panel 8 to be closer to the first edge portion 16 of the sixth panel 8 than the curved side 17 of the second U-shaped cutout portion 14. This particular orientation of the U-shaped cutout portions 14 and openings formed therefrom is for a top loading optical disc case.

Alternatively, for a side loading optical disc case, the curved side 17 of the first U-shaped cutout portion 14 is oriented in the third panel 5 to be closer to the third edge portion 20 of the third panel 5 than the straight side 19 of the first U-shaped cutout portion 14, and the straight side 19 of the first U-shaped cutout portion 14 is oriented in the third panel 5 to be closer to the fourth edge portion 22 of the third panel 5 than the curved side 17 of the first U-shaped cutout portion 14. Furthermore, the curved side 17 of the second U-shaped cutout portion 14 is oriented in the sixth panel 8 to be closer to the third edge portion 20 of the sixth panel 8 than the straight side 19 of the second U-shaped cutout portion 14, and the straight side 19 of the second U-shaped cutout portion 14 is oriented in the sixth panel 8 to be closer to the fourth edge portion 22 of the sixth panel 8 than the curved side 17 of the second U-shaped cutout portion 14.

In a more preferred form of the present invention, the second panel 4 includes a first disc access cutout portion 15 formed therein, and the fifth panel 7 includes a second disc access cutout portion 15 formed therein. The first and second disc cutout portions 15, 15 are provided to facilitate the insertion and removal of an optical disc from the case by a user.

In a preferred form of the optical case, the first disc access cutout portion 15 is disposed nearer to the second edge portion 18 of the second panel 4 than to the first edge portion 16 of the second panel 4, and the second disc access cutout portion 15 is disposed nearer to the second edge portion 18 of the fifth panel 7 than to the first edge portion 16 of the fifth panel 7.

Preferably, each of the first and second disc access cutout portions 15, 15 includes a straight side 21 and a protruding side 23 disposed opposite the straight side 21, such as the curved side extending away from the straight side, as shown in figures.

For the top loading optical disc case, the protruding side 23 of the first disc access cutout portion 15 is oriented in the second panel 4 to be closer to the first edge portion 16 of the second panel 4 and the second fold juncture B than the straight side 12 of the first disc access cutout portion 15, and the straight side 21 of the first disc access cutout portion 15 is oriented in the second panel 4 to be closer to the second edge portion 18 of the second panel 4 than the protruding side 23 of the first disc access cutout portion 15. Furthermore, the protruding side 23 of the second disc access cutout portion 15 is oriented in the fifth panel 7 to be closer to the first edge portion 16 of the fifth panel 7 and the fifth fold juncture E than the straight side 21 of the second disc access cutout portion 15, and the straight side of the second disc access cutout portion 15 is oriented in the fifth panel 7 to be closer to the second edge portion 18 of the fifth panel 7 than the protruding side 23 of the second disc access cutout portion 15.

For the side loading optical disc case, the protruding side 23 of the first disc access cutout portion 15 is oriented in the second panel 4 to be closer to the third edge portion 20 of the second panel 4 and the first fold juncture A than the straight side 21 of the first disc access cutout portion 15, and the straight side 21 of the first disc access cutout portion 15 is oriented in the second panel 4 to be closer to the fourth edge portion 22 of the second panel 4 and the third fold juncture C than the protruding side 23 of the first disc access cutout portion 15. Furthermore, the protruding side 23 of the second disc access cutout portion 15 is oriented in the fifth panel 7 to be closer to the third edge portion 20 of the fifth panel 7 and the fourth fold juncture D than the straight side 21 of the second disc access cutout portion 15, and the straight side 21 of the second disc access cutout portion 15 is oriented in the fifth panel 7 to be closer to the fourth edge portion 22 of the fifth panel 7 than the protruding side 23 of the second disc access cutout portion 15.

Preferably, the first and second disc access cutout portions 15, 15 are removable from the second and fifth panels 4, 7, respectively, to define openings for a user of the optical disc case to grasp an optical disc held thereby.

In another preferred form of the optical disc case of the present invention, the second and third panels 4, 5 folded relative to each other are adhesively joined together, the fifth and sixth panels 7, 8 folded relative to each other are adhesively joined together, and the fourth panel 6 is adhesively joined to the third panel 5 folded relative to the second panel 4.

In another form of the present invention, a case for holding an optical disc further includes at least one end blank 24 formed of foldable material having at least two interconnected panels including a first end blank panel 26 and a second end blank 28 panel. Each of the first end blank panel 26 and the second end blank 28 panel has a front surface 27 and a rear surface 29 situated opposite the front surface 27, and further has a first edge portion 31, a second edge portion 33 disposed opposite the first edge portion 31, a third edge portion 35 joined to the first and second edge portions 31, 33 and extending therebetween, and a fourth edge portion 37 disposed opposite the third edge portion 35 and joined to the first and second edge portions 31, 33 and extending therebetween. The fourth edge portion 37 of the first end blank panel 26 is joined to the third edge portion 35 of the second end blank 28 panel at a sixth fold juncture F, the first and second end blank panels 26, 28 being foldable relative to each other along the sixth fold juncture F. The first and second end blank panels 26, 28 are folded relative to each other along the sixth fold juncture F such that the rear surface 29 of the first end blank panel 26 is in close proximity to and faces the rear surface 29 of the second end blank panel 28 to define a folded end blank 24. The folded end blank 24 is situated adjacent the folded primary blank 2 such that the front surface 27 of the first end blank panel 26 is in close proximity to and faces the rear surface 12 of the sixth panel 8 of the folded primary blank 2, the folded end blank 24 and folded primary blank 2 together defining a folded composite blank 39.

Preferably, the first end blank panel 26 of the folded end blank 24 and the sixth panel 8 of the folded primary blank 2 are adhesively joined together. Furthermore, the peripheral area 30 of the sixth panel 8 of the folded primary blank 2 defines a spacer situated between the fifth panel 7 of the folded primary blank 2 and the first end blank panel 26 of the folded end blank 24, and the second U-shaped cutout portion 14 is removable from the sixth panel 8 to define an opening for receiving at least partially therein an optical disc, the opening being at least partially surrounded by the peripheral area 30 of the sixth panel 8 defining the spacer.

In yet another preferred form of the present invention, a case for holding an optical disc further includes a cover piece 42, the cover piece 42 having a spine 43, a front cover 46 foldably joined to the spine 43, and a back cover 44 foldably joined to the spine 43. Each of the front cover 46 and the back cover 44 includes an inside surface 48 and an outside surface 50 disposed opposite the inside surface 48. The folded composite blank 39 is disposed between the front cover 46 and the back cover 44 of the cover piece 42.

Preferably, the folded composite blank 39 is joined to the cover piece 42. Even more specifically in this regard, the front surface 10 of the first panel 3 of the folded primary blank 2 is joined preferably with an adhesive 9 to the inside surface 48 of one of the front cover 46 and the back cover 44 of the cover piece 42. Alternatively, or in combination with the foregoing, the front surface 27 of the second end blank panel 28 of the folded end blank 24 is joined preferably with an adhesive 9 to the inside surface 48 of one of the front cover 46 and the back cover 44 of the cover piece 42.

In yet another form of the present invention, a case for holding an optical disc includes at least two primary blanks 2 formed of foldable material and including a first primary blank 2 and a second primary blank 2 joined to the first primary blank 2, each of the first and second primary blanks 2, 2 having at least six interconnected panels including a first panel 3, a second panel 4, a third panel 5, a fourth panel 6, a fifth panel 7 and a sixth panel 8. As stated earlier, each of the first panel 3, second panel 4, third panel 5, fourth panel 6, fifth panel 7 and sixth panel 8 of each of the first and second primary blanks 2, 2 has a front surface 10 and a rear surface 12 situated opposite the front surface 10, and further has a first edge portion 16, a second edge portion 18 disposed opposite the first edge portion 16, a third edge portion 20 joined to the first and second edge portions 16, 18 and extending therebetween, and a fourth edge portion 22 disposed opposite the third edge portion 20 and joined to the first and second edge portions 16, 18 and extending therebetween. For each of the first and second primary blanks 2, 2, the fourth edge portion 22 of the first panel 3 is joined to the third edge portion 20 of the second panel 4 at a first fold juncture A, the first and second panels 3, 4 being foldable relative to each other along the first fold juncture A. Also, for each of the first and second primary blanks 2, 2, the first edge portion 16 of the second panel 4 is joined to the second edge portion 18 of the third panel 5 at a second fold juncture B, the second and third panels 4, 5 being foldable relative to each other along the second fold juncture B. For each of the first and second primary blanks 2, 2, the fourth edge portion 22 of the second panel 4 is joined to the third edge portion 20 of the fourth panel 6 at a third fold juncture C, the second and fourth panels 4, 6 being foldable relative to each other along the third fold juncture C. Furthermore, for each of the first and second primary blanks 2, 2, the fourth edge portion 22 of the fourth panel 6 is joined to the third edge portion 20 of the fifth panel 7 at a fourth fold juncture D, the fourth and fifth panels 6, 7 being foldable relative to each other along the fourth fold juncture D. Additionally, for each of the first and second primary blanks 2, 2, the first edge portion 16 of the fifth panel 7 is joined to the second edge portion 18 of the sixth panel 8 at a fifth fold juncture E, the fifth and sixth panels 7, 8 being foldable relative to each other along the fifth fold juncture E.

Also, for each of the first and second primary blanks 2, 2, the third panel 5 includes a first U-shaped cutout portion 14 formed therein, and a peripheral area 30 at least partially surrounding the first U-shaped cutout portion 14, and, for each of the first and second primary blanks 2, 2, the sixth panel 8 includes a second U-shaped cutout portion 14 formed therein, and a peripheral area 30 at least partially surrounding the second U-shaped cutout portion 14.

For each of the first and second primary blanks 2, 2 in this embodiment of the optical disc case, the second and third panels 4, 5 are folded relative to each other along the second fold juncture B such that the front surface 10 of the second panel 4 is in close proximity to and faces the front surface 10 of the third panel 5, and, for each of the first and second primary blanks 2, 2, the fifth and sixth panels 7, 8 are folded relative to each other along the fifth fold juncture E such that the front surface 10 of the fifth panel 7 is in close proximity to and faces the front surface 10 of the sixth panel 8. Also, for each of the first and second primary blanks 2, 2, the second and fourth panels 4, 6 are folded relative to each other along the third fold juncture C such that the front surface 10 of the fourth panel 6 is in close proximity to and faces the rear surface 12 of the third panel 5 folded in close proximity to the second panel 4, and, for each of the first and second primary blanks 2, 2, the fourth and fifth panels 6, 7 are folded relative to each other along the fourth fold juncture D such that the rear surface 12 of the fifth panel 7 is in close proximity to and faces the rear surface 12 of the fourth panel 6.

Furthermore, for each of the first and second primary blanks 2, 2, the first and second panels 3, 4 are folded relative to each other along the first fold juncture A such that the rear surface 12 of the first panel 3 is in close proximity to and faces the rear surface 12 of the second panel 4 to define respective folded first and second primary blanks 2, 2.

The folded first primary blank 2 is situated adjacent the folded second primary blank 2 such that the front surface 10 of the first panel 3 of the folded first primary blank 2 is in close proximity to and faces the rear surface 12 of the sixth panel 8 of the folded second primary blank 2, the folded first primary blank 2 and the folded second primary blank 2 together defining a folded composite blank.

Preferably, the first panel 3 of the folded first primary blank 2 and the sixth panel 8 of the folded second primary blank 2 are adhesively joined together. The peripheral area 30 of the sixth panel 8 of the folded second primary blank 2 defines a spacer situated between the fifth panel 7 of the folded second primary blank 2 and the first panel 3 of the folded first primary blank 2. The second U-shaped cutout portion 14 of the folded second primary blank 2 is removable from the sixth panel 8 of the folded second primary blank 2 to define an opening for receiving at least partially therein an optical disc, the opening being at least partially surrounded by the peripheral area 30 of the sixth panel 8 of the folded second primary blank 2 defining the spacer.

A method of making a case for holding an optical disc will now be described again in detail. The first step in the method is forming a primary blank 2 of foldable material, the primary blank having, as mentioned previously, at least six interconnected panels including a first panel 3, a second panel 4, a third panel 5, a fourth panel 6, a fifth panel 7 and a sixth panel 8. Each of the first panel 3, second panel 4, third panel 5, fourth panel 6, fifth panel 7 and sixth panel 8 of the primary blank 2 has a front surface 10 and a rear surface 12 situated opposite the front surface 10, and further has a first edge portion 16, a second edge portion 18 disposed opposite the first edge portion 16, a third edge portion 20 joined to the first and second edge portions 16, 18 and extending therebetween, and a fourth edge portion 22 disposed opposite the third edge portion 20 and joined to the first and second edge portions 16, 18 and extending therebetween. The fourth edge portion 22 of the first panel 3 is joined to the third edge portion 20 of the second panel 4 at a first fold juncture A, the first and second panels 3, 4 being foldable relative to each other along the first fold juncture A. The first edge portion 16 of the second panel 4 is joined to the second edge portion 18 of the third panel 5 at a second fold juncture B, the second and third panels 4, 5 being foldable relative to each other along the second fold juncture B. The fourth edge portion 22 of the second panel 4 is joined to the third edge portion 20 of the fourth panel 6 at a third fold juncture C, the second and fourth panels 4, 6 being foldable relative to each other along the third fold juncture C. The fourth edge portion 22 of the fourth panel 6 is joined to the third edge portion 20 of the fifth panel 7 at a fourth fold juncture D, the fourth and fifth panels 6, 7 being foldable relative to each other along the fourth fold juncture D, and the first edge portion 16 of the fifth panel 7 is joined to the second edge portion 18 of the sixth panel 7 at a fifth fold juncture E, the fifth and sixth 7, 8 panels being foldable relative to each other along the fifth fold juncture E.

The method further includes the steps of forming a first U-shaped cutout portion 14 in the third panel 5, the third panel 5 including a peripheral area 30 at least partially surrounding the first U-shaped cutout portion 14, and forming a second U-shaped cutout portion 14 in the sixth panel 8, the sixth panel 8 including a peripheral area 30 at least partially surrounding the second U-shaped cutout portion 14.

The method also includes the steps of folding the second and third panels 4, 5 relative to each other along the second fold juncture B such that the front surface 10 of the second panel 4 is in close proximity to and faces the front surface 10 of the third panel 5, folding the fifth and sixth panels 7, 8 relative to each other along the fifth fold juncture E such that the front surface 10 of the fifth panel 7 is in close proximity to and faces the front surface 10 of the sixth panel 8, folding the second and fourth panels 4, 6 relative to each other along the third fold juncture C such that the front surface 10 of the fourth panel 6 is in close proximity to and faces the rear surface 12 of the third panel 5 folded in close proximity to the second panel 4, folding the fourth and fifth panels 6, 7 relative to each other along the fourth fold juncture D such that the rear surface 12 of the fifth panel 7 is in close proximity to and faces the rear surface 12 of the fourth panel 6, and folding the first and second panels 3, 4 relative to each other along the first fold juncture A such that the rear surface 12 of the first panel 3 is in close proximity to and faces the rear surface 12 of the second panel 4, thereby defining a folded primary blank 2.

The method of making a case for holding an optical disc further preferably includes the steps of removing the first and second U-shaped cutout portions 14, 14 from the third and sixth panels 5, 8, respectively, to define openings for receiving at least partially therein respective optical discs.

More specifically, the peripheral area 30 of the third panel 5 defines a spacer situated between the second panel 4 and the fourth panel 6. Furthermore, the method further includes the steps of removing the first U-shaped cutout portion 14 from the third panel 5 to define an opening for receiving at least partially therein an optical disc, the opening being at least partially surrounded by the peripheral area 30 of the third panel 5 defining the spacer.

Even more specifically, the steps of forming the first and second U-shaped cutout portions 14, 14 respectively in the third and sixth 5, 8 panels further include the step of forming each of the first and second U-shaped cutout portions 14, 14 with a curved side 17 and a straight side 19 disposed opposite the curved side 17.

When making a top loading optical disc case, the steps of forming the first and second U-shaped cutout portions 14, 14 respectively in the third and sixth panels 5, 8 further include the steps of orienting the curved side 17 of the first U-shaped cutout portion 14 in the third panel 5 to be closer to the second edge portion 18 of the third panel 5 and the second fold juncture B than the straight side 19 of the first U-shaped cutout portion 14, orienting the straight side 19 of the first U-shaped cutout portion 14 in the third panel 5 to be closer to the first edge portion 16 of the third panel 5 than the curved side 17 of the first U-shaped cutout portion 14, orienting the curved side 17 of the second U-shaped cutout portion 14 in the sixth panel 8 to be closer to the second edge portion 18 of the sixth panel 8 and fifth fold juncture E than the straight side 19 of the second U-shaped cutout portion 14, and orienting the straight side 19 of the second U-shaped cutout portion 14 in the sixth panel 8 to be closer to the first edge portion 16 of the sixth panel 8 than the curved side 17 of the second U-shaped cutout portion 14.

When making a side loading optical disc case, the steps of forming the first and second U-shaped cutout portions 14, 14 respectively in the third and sixth panels 5, 8 further include the steps of orienting the curved side 17 of the first U-shaped cutout portion 14 in the third panel 5 to be closer to the third edge portion 20 of the third panel 5 than the straight side 19 of the first U-shaped cutout portion 14, orienting the straight side 19 of the first U-shaped cutout portion 14 in the third panel 5 to be closer to the fourth edge portion 22 of the third panel 5 than the curved side 17 of the first U-shaped cutout portion 14, orienting the curved side 17 of the second U-shaped cutout portion 14 in the sixth panel 8 to be closer to the third edge portion 20 of the sixth panel 8 than the straight side 19 of the second U-shaped cutout portion 14, and orienting the straight side 19 of the second U-shaped cutout portion 14 in the sixth panel 8 to be closer to the fourth edge portion 22 of the sixth panel 8 than the curved side 17 of the second. U-shaped cutout portion 14.

Furthermore, a preferred method of making a case for holding an optical disc includes the steps of forming a first disc access cutout portion 15 in the second panel 4, and forming a second disc access cutout portion 15 in the fifth panel 7. The steps of forming the first and second disc access cutout portions 15, 15 respectively in the second and fifth panels 4, 7 may further include the steps of positioning the first disc access cutout portion 15 nearer to the second edge portion 18 of the second panel 4 than to the first edge portion 16 of the second panel 4, and positioning the second disc access cutout portion 15 nearer to the second edge portion 18 of the fifth panel 7 than to the first edge portion 16 of the fifth panel 7.

Even more preferably, the steps of forming the first and second disc access cutout portions 15, 15 respectively in the second and fifth panels 4, 7 further include the step of forming each of the first and second disc access cutout portions 15, 15 with a straight side 21 and a protruding side 23 disposed opposite the straight side 21 and protrudes from the straight side 21.

For a top loading optical disc case, the steps of forming the first and second disc access cutout portions 15, 15 respectively in the second and fifth panels 4, 7 may further include the steps of orienting the protruding side 23 of the first disc access cutout portion 15 in the second panel 4 to be closer to the first edge portion 16 of the second panel 4 and the second fold juncture B than the straight side 21 of the first disc access cutout portion 15, orienting the straight side 21 of the first disc access cutout portion 15 in the second panel 4 to be closer to the second edge portion 18 of the second panel 4 than the protruding side 23 of the first disc access cutout portion 15, orienting the protruding side 23 of the second disc access cutout portion 15 in the fifth panel 7 to be closer to the first edge portion 16 of the fifth panel 7 and the fifth fold juncture E than the straight side 21 of the second disc access cutout portion 15, and orienting the straight side 21 of the second disc access cutout portion 15 in the fifth panel 7 to be closer to the second edge portion 18 of the fifth panel 7 than the protruding side 23 of the second disc access cutout portion 15.

For a side loading optical disc case, the steps of forming the first and second disc access cutout portions 15, 15 respectively in the second and fifth panels 4, 7 may further include the steps of orienting the protruding side 23 of the first disc access cutout portion 15 in the second panel 4 to be closer to the third edge portion 20 of the second panel 4 and the first fold juncture A than the straight side 21 of the first disc access cutout portion 15, orienting the straight side 21 of the first disc access cutout portion 15 in the second panel 4 to be closer to the fourth edge portion 22 of the second panel 4 and the third fold juncture C than the protruding side 23 of the first disc access cutout portion 15, orienting the protruding side 23 of the second disc access cutout portion 15 in the fifth panel 7 to be closer to the third edge portion 20 of the fifth panel 7 and the fourth fold juncture D than the straight side 21 of the second disc access cutout portion 15, and orienting the straight side 21 of the second disc access cutout portion 15 in the fifth panel 7 to be closer to the fourth edge portion 22 of the fifth panel 7 than the protruding side 23 of the second disc access cutout portion 15.

The method of making a case for holding an optical disc in accordance with the present invention may further include the step of removing the first and second disc access cutout portions 15, 15 from the second and fifth panels 4, 7, respectively, to define openings for a user of the optical disc case to grasp an optical disc held thereby.

Preferably, the present invention further includes the steps of adhesively joining together the second and third panels 4, 5 folded relative to each other, adhesively joining together the fifth and sixth panels 7, 8 folded relative to each other, and adhesively joining the fourth panel 6 to the third panel 5 folded relative to the second panel 4.

An even more preferred method of making a case for holding an optical disc includes the steps of forming at least one end blank 24 of foldable material having at least two interconnected panels including a first end blank panel 26 and a second end blank panel 28. Each of the first end blank panel 26 and the second end blank panel 28 has a front surface 27 and a rear surface 29 situated opposite the front surface 27, and further has a first edge portion 31, a second edge portion 33 disposed opposite the first edge portion 31, a third edge portion 35 joined to the first and second edge portions 31, 33 and extending therebetween, and a fourth edge portion 37 disposed opposite the third edge portion 35 and joined to the first and second edge portions 31, 33 and extending therebetween. The fourth edge portion 37 of the first end blank panel 26 is joined to the third edge portion 35 of the second end blank panel 28 at a sixth fold juncture F, the first and second end blank panels 26, 28 being foldable relative to each other along the sixth fold juncture F.

The method preferably further includes the steps of folding the first and second end blank panels 26, 28 relative to each other along the sixth fold juncture F such that the rear surface 29 of the first end blank panel 26 is in close proximity to and faces the rear surface 29 of the second end blank panel 28 to define a folded end blank 24, positioning the folded end blank 24 adjacent the folded primary blank 2 such that the front surface 27 of the first end blank panel 26 is in close proximity to and faces the rear surface 12 of the sixth panel 8 of the folded primary blank 2, the folded end blank 24 and folded primary blank 2 together defining a folded composite blank 39, and adhesively joining together the first end blank panel 26 of the folded end blank 24 and the sixth panel 8 of the folded primary blank 2.

The peripheral area 30 of the sixth panel 8 of the folded primary blank 2 defines a spacer situated between the fifth panel 7 of the folded primary blank 2 and the first end blank panel 26 of the folded end blank 24. Accordingly, the method further includes the step of removing the second U-shaped cutout portion 14 from the sixth panel 8 to define an opening for receiving at least partially therein an optical disc, the opening being at least partially surrounded by the peripheral area 30 of the sixth panel 8 defining the spacer.

In accordance with another preferred method of making a case for holding an optical disc, the method may further include the steps of forming a cover piece 42, the cover piece 42 having a spine 43, a front cover 46 foldably joined to the spine 43, and a back cover 44 foldably joined to the spine 43, each of the front cover 46 and the back cover 44 including an inside surface 48 and an outside surface 50 disposed opposite the inside surface 48, positioning the folded composite blank 39 between the front cover 46 and the back cover 44 of the cover piece 42, and joining the folded composite blank 39 to the cover piece 42.

Preferably, the step of joining the folded composite blank 39 to the cover piece 42 includes the further step of joining the front surface 10 of the first panel 3 of the folded primary blank 2 to the inside surface 48 of one of the front cover 46 and the back cover 44 of the cover piece 42 such as by using an adhesive 9, or joining the front surface 27 of the second end blank panel 28 of the folded end blank 24 to the inside surface 48 of one of the front cover 46 and the back cover 44 of the cover piece 42 also such as by using an adhesive 9, or both steps.

Alternatively, a method of making a case for holding an optical disc may include the steps of forming at least two primary blanks of foldable material, the at least two primary blanks including a first primary blank 2 and a second primary blank 2, each of the first and second primary blanks 2, 2 having the structure of the primary blank 2 described previously, and each of the first and second primary blanks 2, 2 being folded in accordance with the method described previously to define respective folded first and second primary blanks 2,2, and positioning the folded first primary blank 2 adjacent the folded second primary blank 2 such that the front surface 10 of the first panel 3 of the folded first primary blank 2 is in close proximity to and faces the rear surface of the sixth panel 8 of the folded second primary blank 2, the folded first primary blank 2 and the folded second primary blank 2 together defining a folded composite blank. This method may further include the step of adhesively joining together the first panel 3 of the folded first primary blank 2 and the sixth panel 8 of the folded second primary blank 2.

Preferably, the peripheral area 30 of the sixth panel 8 of the folded second primary blank 2 defines a spacer situated between the fifth panel 7 of the folded second primary blank 2 and the first panel 3 of the folded first primary blank 2. Accordingly, a preferred method of forming the optical disc case with at least two primary blanks 2, 2 includes the further step of removing the second U-shaped cutout portion 14 of the folded second primary blank 2 from the sixth panel 8 of the folded second primary blank 2 to define an opening for receiving at least partially therein an optical disc, the opening being at least partially surrounded by the peripheral area 30 of the sixth panel 8 of the folded second primary blank 2 defining the spacer.

As is evident from the previous description, assembly of the optical disc case of the present invention involves only five primary folding operations per blank 2, thus simplifying the manufacturing and assembling process and decreasing the overall costs of producing optical disc cases. Furthermore, unlike conventional CD, DVD and BD cases, no separate spacers are required to form the pockets with the present invention. The spacers are defined by interconnected panels of the single blank 2.

While the invention has been illustrated and described in detail in the drawings and foregoing description, the same is to be considered illustrative and not restrictive in character, it being understood that only the preferred embodiments have been shown and described and that all changes and modifications that come within the spirit of the invention are desired to be protected.

What is claimed is:

1. A case for holding an optical disc, which comprises:

a primary blank formed of foldable material having at least six interconnected panels including a first panel, a second panel, a third panel, a fourth panel, a fifth panel and a sixth panel, each of the first panel, second panel, third panel, fourth panel, fifth panel and sixth panel of the primary blank having a front surface and a rear surface situated opposite the front surface, and further having a first edge portion, a second edge portion disposed opposite the first edge portion, a third edge portion joined to the first and second edge portions and extending therebetween, and a fourth edge portion disposed opposite the third edge portion and joined to the first and second edge portions and extending therebetween;

wherein the fourth edge portion of the first panel is joined to the third edge portion of the second panel at a first fold juncture, the first and second panels being foldable relative to each other along the first fold juncture;

wherein the first edge portion of the second panel is joined to the second edge portion of the third panel at a second fold juncture, the second and third panels being foldable relative to each other along the second fold juncture;

wherein the fourth edge portion of the second panel is joined to the third edge portion of the fourth panel at a third fold juncture, the second and fourth panels being foldable relative to each other along the third fold juncture;

wherein the fourth edge portion of the fourth panel is joined to the third edge portion of the fifth panel at a fourth fold juncture, the fourth and fifth panels being foldable relative to each other along the fourth fold juncture;

wherein the first edge portion of the fifth panel is joined to the second edge portion of the sixth panel at a fifth fold juncture, the fifth and sixth panels being foldable relative to each other along the fifth fold juncture;

wherein the third panel includes a first U-shaped cutout portion formed therein, and a peripheral area at least partially surrounding the first U-shaped cutout portion;

wherein the sixth panel includes a second U-shaped cutout portion formed therein, and a peripheral area at least partially surrounding the second U-shaped cutout portion;

wherein the second and third panels are folded relative to each other along the second fold juncture such that the front surface of the second panel is directly adjacent to and faces the front surface of the third panel;

wherein the fifth and sixth panels are folded relative to each other along the fifth fold juncture such that the front surface of the fifth panel is directly adjacent to and faces the front surface of the sixth panel;

wherein the second and fourth panels are folded relative to each other along the third fold juncture such that the front surface of the fourth panel is directly adjacent to and faces the rear surface of the third panel folded in close proximity to the second panel;

wherein the fourth and fifth panels are folded relative to each other along the fourth fold juncture such that the rear surface of the fifth panel is directly adjacent to and faces the rear surface of the fourth panel; and wherein the first and second panels are folded relative to each other along the first fold juncture such that the rear surface of the first panel is directly adjacent to and faces the rear surface of the second panel to define a folded primary blank.

2. A case for holding an optical disc as defined by claim 1, wherein the first and second U-shaped cutout portions are removable from the third and sixth panels, respectively, to define openings for receiving at least partially therein respective optical discs.

3. A case for holding an optical disc as defined by claim 1, wherein the peripheral area of the third panel defines a spacer situated between the second panel and the fourth panel; and wherein the first U-shaped cutout portion is removable from the third panel to define an opening for receiving at least partially therein an optical disc, the opening being at least partially surrounded by the peripheral area of the third panel defining the spacer.

4. A case for holding an optical disc as defined by claim 1, wherein each of the first and second U-shaped cutout portions includes a curved side and a straight side disposed opposite the curved side.

5. A case for holding an optical disc as defined by claim 4, wherein the curved side of the first U-shaped cutout portion is oriented in the third panel to be closer to the second edge portion of the third panel and the second fold juncture than the straight side of the first U-shaped cutout portion; and wherein the straight side of the first U-shaped cutout portion is oriented in the third panel to be closer to the first edge portion of the third panel than the curved side of the first U-shaped cutout portion; and wherein the curved side of the second U-shaped cutout portion is oriented in the sixth panel to be closer to the second edge portion of the sixth panel and fifth fold juncture than the straight side of the second U-shaped cutout portion; and wherein the straight side of the second U-shaped cutout portion is oriented in the sixth panel to be closer to the first edge portion of the sixth panel than the curved side of the second U-shaped cutout portion.

6. A case for holding an optical disc as defined by claim 4, wherein the curved side of the first U-shaped cutout portion is oriented in the third panel to be closer to the third edge portion of the third panel than the straight side of the first U-shaped cutout portion; and wherein the straight side of the first U-shaped cutout portion is oriented in the third panel to be closer to the fourth edge portion of the third panel than the curved side of the first U-shaped cutout portion; and wherein the curved side of the second U-shaped cutout portion is oriented in the sixth panel to be closer to the third edge portion of the sixth panel than the straight side of the second U-shaped cutout portion; and wherein the straight side of the second U-shaped cutout portion is oriented in the sixth panel to be closer to the fourth edge portion of the sixth panel than the curved side of the second U-shaped cutout portion.

7. A case for holding an optical disc as defined by claim 1, wherein the second panel includes a first disc access cutout portion formed therein; and wherein the fifth panel includes a second disc access cutout portion formed therein.

8. A case for holding an optical disc as defined by claim 7, wherein the first disc access cutout portion is disposed nearer to the second edge portion of the second panel than to the first edge portion of the second panel; and
wherein the second disc access cutout portion is disposed nearer to the second edge portion of the fifth panel than to the first edge portion of the fifth panel.

9. A case for holding an optical disc as defined by claim 7, wherein each of the first and second disc access cutout portions includes a straight side and a protruding side disposed opposite the straight side.

10. A case for holding an optical disc as defined by claim 9, wherein the protruding side of the first disc access cutout portion is oriented in the second panel to be closer to the first edge portion of the second panel and the second fold juncture than the straight side of the first disc access cutout portion; and wherein the straight side of the first disc access cutout portion is oriented in the second panel to be closer to the second edge portion of the second panel than the protruding side of the first disc access cutout portion; and
wherein the protruding side of the second disc access cutout portion is oriented in the fifth panel to be closer to the first edge portion of the fifth panel and the fifth fold juncture than the straight side of the second disc access cutout portion; and wherein the straight side of the second disc access cutout portion is oriented in the fifth panel to be closer to the second edge portion of the fifth panel than the protruding side of the second disc access cutout portion.

11. A case for holding an optical disc as defined by claim 9, wherein the protruding side of the first disc access cutout portion is oriented in the second panel to be closer to the third edge portion of the second panel and the first fold juncture than the straight side of the first disc access cutout portion; and wherein the straight side of the first disc access cutout portion is oriented in the second panel to be closer to the fourth edge portion of the second panel and the third fold juncture than the protruding side of the first disc access cutout portion; and
wherein the protruding side of the second disc access cutout portion is oriented in the fifth panel to be closer to the third edge portion of the fifth panel and the fourth fold juncture than the straight side of the second disc access cutout portion; and wherein the straight side of the second disc access cutout portion is oriented in the fifth panel to be closer to the fourth edge portion of the fifth panel than the protruding side of the second disc access cutout portion.

12. A case for holding an optical disc as defined by claim 7, wherein the first and second disc access cutout portions are removable from the second and fifth panels, respectively, to define openings for a user of the optical disc case to grasp an optical disc held thereby.

13. A case for holding an optical disc as defined by claim 1, wherein the second and third panels folded relative to each other are adhesively joined together;
wherein the fifth and sixth panels folded relative to each other are adhesively joined together; and
wherein the fourth panel is adhesively joined to the third panel folded relative to the second panel.

14. A case for holding an optical disc as defined by claim 1, which further comprises:
at least one end blank formed of foldable material having at least two interconnected panels including a first end blank panel and a second end blank panel, each of the first end blank panel and the second end blank panel having a front surface and a rear surface situated opposite the front surface, and further having a first edge portion, a second edge portion disposed opposite the first edge portion, a third edge portion joined to the first and second edge portions and extending therebetween, and a fourth edge portion disposed opposite the third edge portion and joined to the first and second edge portions and extending therebetween;
wherein the fourth edge portion of the first end blank panel is joined to the third edge portion of the second end blank panel at a sixth fold juncture, the first and second end blank panels being foldable relative to each other along the sixth fold juncture;
wherein the first and second end blank panels are folded relative to each other along the sixth fold juncture such that the rear surface of the first end blank panel is directly adjacent to and faces the rear surface of the second end blank panel to define a folded end blank; and
wherein the folded end blank is situated adjacent the folded primary blank such that the front surface of the first end blank panel is directly adjacent to and faces the rear surface of the sixth panel of the folded primary blank, the folded end blank and folded primary blank together defining a folded composite blank.

15. A case for holding an optical disc as defined by claim 14, wherein the first end blank panel of the folded end blank and the sixth panel of the folded primary blank are adhesively joined together.

16. A case for holding an optical disc as defined by claim 14, wherein the peripheral area of the sixth panel of the folded primary blank defines a spacer situated between the fifth panel of the folded primary blank and the first end blank panel of the folded end blank; and
wherein the second U-shaped cutout portion is removable from the sixth panel to define an opening for receiving at least partially therein an optical disc, the opening being at least partially surrounded by the peripheral area of the sixth panel defining the spacer.

17. A case for holding an optical disc as defined by claim 14, which further comprises:
a cover piece, the cover piece having a spine, a front cover foldably joined to the spine, and a back cover foldably joined to the spine, each of the front cover and the back cover including an inside surface and an outside surface disposed opposite the inside surface;
wherein the folded composite blank is disposed between the front cover and the back cover of the cover piece.

18. A case for holding an optical disc as defined by claim 17, wherein the folded composite blank is joined to the cover piece.

19. A case for holding an optical disc as defined by claim 18, wherein the front surface of the first panel of the folded primary blank is joined to the inside surface of one of the front cover and the back cover of the cover piece.

20. A case for holding an optical disc as defined by claim 18, wherein the front surface of the second end blank panel of the folded end blank is joined to the inside surface of one of the front cover and the back cover of the cover piece.

21. A case for holding an optical disc, which comprises:
at least two primary blanks formed of foldable material and including a first primary blank and a second primary blank joined to the first primary blank, each of the first and second primary blanks having at least six interconnected panels including a first panel, a second panel, a third panel, a fourth panel, a fifth panel and a sixth panel, each of the first panel, second panel, third panel, fourth panel, fifth panel and sixth panel of each of the first and second primary blanks having a front surface and a rear surface situated opposite the front surface, and further having a first edge portion, a second edge portion disposed opposite the first edge portion, a third edge portion joined to the first and second edge portions and extending therebetween, and a fourth edge portion disposed opposite the third edge portion and joined to the first and second edge portions and extending therebetween;

wherein, for each of the first and second primary blanks, the fourth edge portion of the first panel is joined to the third edge portion of the second panel at a first fold juncture, the first and second panels being foldable relative to each other along the first fold juncture;

wherein, for each of the first and second primary blanks, the first edge portion of the second panel is joined to the second edge portion of the third panel at a second fold juncture, the second and third panels being foldable relative to each other along the second fold juncture;

wherein, for each of the first and second primary blanks, the fourth edge portion of the second panel is joined to the third edge portion of the fourth panel at a third fold juncture, the second and fourth panels being foldable relative to each other along the third fold juncture;

wherein, for each of the first and second primary blanks, the fourth edge portion of the fourth panel is joined to the third edge portion of the fifth panel at a fourth fold juncture, the fourth and fifth panels being foldable relative to each other along the fourth fold juncture;

wherein, for each of the first and second primary blanks, the first edge portion of the fifth panel is joined to the second edge portion of the sixth panel at a fifth fold juncture, the fifth and sixth panels being foldable relative to each other along the fifth fold juncture;

wherein, for each of the first and second primary blanks, the third panel includes a first U-shaped cutout portion formed therein, and a peripheral area at least partially surrounding the first U-shaped cutout portion;

wherein, for each of the first and second primary blanks, the sixth panel includes a second U-shaped cutout portion formed therein, and a peripheral area at least partially surrounding the second U-shaped cutout portion;

wherein, for each of the first and second primary blanks, the second and third panels are folded relative to each other along the second fold juncture such that the front surface of the second panel is directly adjacent to and faces the front surface of the third panel;

wherein, for each of the first and second primary blanks, the fifth and sixth panels are folded relative to each other along the fifth fold juncture such that the front surface of the fifth panel is directly adjacent to and faces the front surface of the sixth panel;

wherein, for each of the first and second primary blanks, the second and fourth panels are folded relative to each other along the third fold juncture such that the front surface of the fourth panel is directly adjacent to and faces the rear surface of the third panel folded in close proximity to the second panel;

wherein, for each of the first and second primary blanks, the fourth and fifth panels are folded relative to each other along the fourth fold juncture such that the rear surface of the fifth panel is directly adjacent to and faces the rear surface of the fourth panel; and wherein, for each of the first and second primary blanks, the first and second panels are folded relative to each other along the first fold juncture such that the rear surface of the first panel is directly adjacent to and faces the rear surface of the second panel to define respective folded first and second primary blanks;

wherein the folded first primary blank is situated adjacent the folded second primary blank such that the front surface of the first panel of the folded first primary blank is directly adjacent to and faces the rear surface of the sixth panel of the folded second primary blank, the folded first primary blank and the folded second primary blank together defining a folded composite blank.

22. A case for holding an optical disc as defined by claim 21, wherein the first panel of the folded first primary blank and the sixth panel of the folded second primary blank are adhesively joined together.

23. A case for holding an optical disc as defined by claim 21, wherein the peripheral area of the sixth panel of the folded second primary blank defines a spacer situated between the fifth panel of the folded second primary blank and the first panel of the folded first primary blank; and wherein the second U-shaped cutout portion of the folded second primary blank is removable from the sixth panel of the folded second primary blank to define an opening for receiving at least partially therein an optical disc, the opening being at least partially surrounded by the peripheral area of the sixth panel of the folded second primary blank defining the spacer.

24. A method of making a case for holding an optical disc, which comprises:

forming a primary blank of foldable material, the primary blank having at least six interconnected panels including a first panel, a second panel, a third panel, a fourth panel, a fifth panel and a sixth panel, each of the first panel, second panel, third panel, fourth panel, fifth panel and sixth panel of the primary blank having a front surface and a rear surface situated opposite the front surface, and further having a first edge portion, a second edge portion disposed opposite the first edge portion, a third edge portion joined to the first and second edge portions and extending therebetween, and a fourth edge portion disposed opposite the third edge portion and joined to the first and second edge portions and extending therebetween; wherein the fourth edge portion of the first panel is joined to the third edge portion of the second panel at a first fold juncture, the first and second panels being foldable relative to each other along the first fold juncture; wherein the first edge portion of the second panel is joined to the second edge portion of the third panel at a second fold juncture, the second and third panels being foldable relative to each other along the second fold juncture; wherein the fourth edge portion of the second panel is joined to the third edge portion of the fourth panel at a third fold juncture, the second and fourth panels being foldable relative to each other along the third fold juncture; wherein the fourth edge portion of the fourth panel is joined to the third edge portion of the fifth panel at a fourth fold juncture, the fourth and fifth panels being foldable relative to each other along the fourth fold juncture; and wherein the first edge portion of the fifth panel is joined to the second edge portion of the sixth panel at a fifth fold juncture, the fifth and sixth panels being foldable relative to each other along the fifth fold juncture;

forming a first U-shaped cutout portion in the third panel, the third panel including a peripheral area at least partially surrounding the first U-shaped cutout portion;

forming a second U-shaped cutout portion in the sixth panel, the sixth panel including a peripheral area at least partially surrounding the second U-shaped cutout portion;

folding the second and third panels relative to each other along the second fold juncture such that the front surface of the second panel is directly adjacent to and faces the front surface of the third panel;

folding the fifth and sixth panels relative to each other along the fifth fold juncture such that the front surface of the fifth panel is directly adjacent to and faces the front surface of the sixth panel;

folding the second and fourth panels relative to each other along the third fold juncture such that the front surface of the fourth panel is directly adjacent to and faces the rear surface of the third panel folded in close proximity to the second panel;

folding the fourth and fifth panels relative to each other along the fourth fold juncture such that the rear surface of the fifth panel is directly adjacent to and faces the rear surface of the fourth panel; and folding the first and second panels relative to each other along the first fold juncture such that the rear surface of the first panel is directly adjacent to and faces the rear surface of the second panel, thereby defining a folded primary blank.

25. A method of making a case for holding an optical disc as defined by claim 24, which further comprises the step of:

removing the first and second U-shaped cutout portions from the third and sixth panels, respectively, to define openings for receiving at least partially therein respective optical discs.

26. A method of making a case for holding an optical disc as defined by claim 24, wherein the peripheral area of the third panel defines a spacer situated between the second panel and the fourth panel; and wherein the method further comprises the step of:

removing the first U-shaped cutout portion from the third panel to define an opening for receiving at least partially therein an optical disc, the opening being at least partially surrounded by the peripheral area of the third panel defining the spacer.

27. A method of making a case for holding an optical disc as defined by claim 24, wherein the steps of forming the first and second U-shaped cutout portions respectively in the third and sixth panels further comprise the step of:

forming each of the first and second U-shaped cutout portions with a curved side and a straight side disposed opposite the curved side.

28. A method of making a case for holding an optical disc as defined by claim 27, wherein the steps of forming the first and second U-shaped cutout portions respectively in the third and sixth panels further comprise the steps of:

orienting the curved side of the first U-shaped cutout portion in the third panel to be closer to the second edge portion of the third panel and the second fold juncture than the straight side of the first U-shaped cutout portion;

orienting the straight side of the first U-shaped cutout portion in the third panel to be closer to the first edge portion of the third panel than the curved side of the first U-shaped cutout portion;

orienting the curved side of the second U-shaped cutout portion in the sixth panel to be closer to the second edge portion of the sixth panel and fifth fold juncture than the straight side of the second U-shaped cutout portion; and orienting the straight side of the second U-shaped cutout portion in the sixth panel to be closer to the first edge portion of the sixth panel than the curved side of the second U-shaped cutout portion.

29. A method of making a case for holding an optical disc as defined by claim 27, wherein the steps of forming the first and second U-shaped cutout portions respectively in the third and sixth panels further comprise the steps of:

orienting the curved side of the first U-shaped cutout portion in the third panel to be closer to the third edge portion of the third panel than the straight side of the first U-shaped cutout portion;

orienting the straight side of the first U-shaped cutout portion in the third panel to be closer to the fourth edge portion of the third panel than the curved side of the first U-shaped cutout portion;

orienting the curved side of the second U-shaped cutout portion in the sixth panel to be closer to the third edge portion of the sixth panel than the straight side of the second U-shaped cutout portion; and orienting the straight side of the second U-shaped cutout portion in the sixth panel to be closer to the fourth edge portion of the sixth panel than the curved side of the second U-shaped cutout portion.

30. A method of making a case for holding an optical disc as defined by claim 24, which further comprises the steps of:

forming a first disc access cutout portion in the second panel; and forming a second disc access cutout portion in the fifth panel.

31. A method of making a case for holding an optical disc as defined by claim 30, wherein the steps of forming the first and second disc access cutout portions respectively in the second and fifth panels further comprise the steps of:

positioning the first disc access cutout portion nearer to the second edge portion of the second panel than to the first edge portion of the second panel; and positioning the second disc access cutout portion nearer to the second edge portion of the fifth panel than to the first edge portion of the fifth panel.

32. A method of making a case for holding an optical disc as defined by claim 30, wherein the steps of forming the first and second disc access cutout portions respectively in the second and fifth panels further comprise the step of:

forming each of the first and second disc access cutout portions with a straight side and a protruding side disposed opposite the straight side.

33. A method of making a case for holding an optical disc as defined by claim 32, wherein the steps of forming the first and second disc access cutout portions respectively in the second and fifth panels further comprise the steps of:

orienting the protruding side of the first disc access cutout portion in the second panel to be closer to the first edge portion of the second panel and the second fold juncture than the straight side of the first disc access cutout portion;

orienting the straight side of the first disc access cutout portion in the second panel to be closer to the second edge portion of the second panel than the protruding side of the first disc access cutout portion;

orienting the protruding side of the second disc access cutout portion in the fifth panel to be closer to the first edge portion of the fifth panel and the fifth fold juncture than the straight side of the second disc access cutout portion; and orienting the straight side of the second disc access cutout portion in the fifth panel to be closer to the second edge portion of the fifth panel than the protruding side of the second disc access cutout portion.

34. A method of making a case for holding an optical disc as defined by claim 32, wherein the steps of forming the first and second disc access cutout portions respectively in the second and fifth panels further comprise the steps of:
orienting the protruding side of the first disc access cutout portion in the second panel to be closer to the third edge portion of the second panel and the first fold juncture than the straight side of the first disc access cutout portion;
orienting the straight side of the first disc access cutout portion in the second panel to be closer to the fourth edge portion of the second panel and the third fold juncture than the protruding side of the first disc access cutout portion;
orienting the protruding side of the second disc access cutout portion in the fifth panel to be closer to the third edge portion of the fifth panel and the fourth fold juncture than the straight side of the second disc access cutout portion; and
orienting the straight side of the second disc access cutout portion in the fifth panel to be closer to the fourth edge portion of the fifth panel than the protruding side of the second disc access cutout portion.

35. A method of making a case for holding an optical disc as defined by claim 24, which further comprises the step of:
removing the first and second disc access cutout portions from the second and fifth panels, respectively, to define openings for a user of the optical disc case to grasp an optical disc held thereby.

36. A method of making a case for holding an optical disc as defined by claim 24, which further comprises the steps of:
adhesively joining together the second and third panels folded relative to each other;
adhesively joining together the fifth and sixth panels folded relative to each other; and
adhesively joining the fourth panel to the third panel folded relative to the second panel.

37. A method of making a case for holding an optical disc as defined by claim 24, which further comprises the steps of:
forming at least one end blank of foldable material having at least two interconnected panels including a first end blank panel and a second end blank panel, each of the first end blank panel and the second end blank panel having a front surface and a rear surface situated opposite the front surface, and further having a first edge portion, a second edge portion disposed opposite the first edge portion, a third edge portion joined to the first and second edge portions and extending therebetween, and a fourth edge portion disposed opposite the third edge portion and joined to the first and second edge portions and extending therebetween; wherein the fourth edge portion of the first end blank panel is joined to the third edge portion of the second end blank panel at a sixth fold juncture, the first and second end blank panels being foldable relative to each other along the sixth fold juncture;
folding the first and second end blank panels relative to each other along the sixth fold juncture such that the rear surface of the first end blank panel is directly adjacent to and faces the rear surface of the second end blank panel to define a folded end blank; and
positioning the folded end blank adjacent the folded primary blank such that the front surface of the first end blank panel is directly adjacent to and faces the rear surface of the sixth panel of the folded primary blank, the folded end blank and folded primary blank together defining a folded composite blank.

38. A method of making a case for holding an optical disc as defined by claim 37, which further comprises the step of:
adhesively joining together the first end blank panel of the folded end blank and the sixth panel of the folded primary blank.

39. A method of making a case for holding an optical disc as defined by claim 37, wherein the peripheral area of the sixth panel of the folded primary blank defines a spacer situated between the fifth panel of the folded primary blank and the first end blank panel of the folded end blank; and
wherein the method further comprises the step of:
removing the second U-shaped cutout portion from the sixth panel to define an opening for receiving at least partially therein an optical disc, the opening being at least partially surrounded by the peripheral area of the sixth panel defining the spacer.

40. A method of making a case for holding an optical disc as defined by claim 37,
which further comprises the steps of:
forming a cover piece, the cover piece having a spine, a front cover foldably joined to the spine, and a back cover foldably joined to the spine, each of the front cover and the back cover including an inside surface and an outside surface disposed opposite the inside surface; and
positioning the folded composite blank between the front cover and the back cover of the cover piece.

41. A method of making a case for holding an optical disc as defined by claim 40, which further comprises the step of:
joining the folded composite blank to the cover piece.

42. A method of making a case for holding an optical disc as defined by claim 41, wherein the step of joining the folded composite blank to the cover piece further comprises the step of:
joining the front surface of the first panel of the folded primary blank to the inside surface of one of the front cover and the back cover of the cover piece.

43. A method of making a case for holding an optical disc as defined by claim 41, wherein the step of joining the folded composite blank to the cover piece further comprises the step of:
joining the front surface of the second end blank panel of the folded end blank to the inside surface of one of the front cover and the back cover of the cover piece.

44. A method of making a case for holding an optical disc, which comprises:
forming at least two primary blanks of foldable material, the at least two primary blanks including a first primary blank and a second primary blank, each of the first and second primary blanks having the structure of the primary blank defined by claim 24, each of the first and second primary blanks being folded in accordance with the method defined by claim 24 to define respective folded first and second primary blanks; and
positioning the folded first primary blank adjacent the folded second primary blank such that the front surface of the first panel of the folded first primary blank is directly adjacent to and faces the rear surface of the sixth panel of the folded second primary blank, the folded first primary blank and the folded second primary blank together defining a folded composite blank.

45. A method of making a case for holding an optical disc as defined by claim 44, which further comprises the step of:
adhesively joining together the first panel of the folded first primary blank and the sixth panel of the folded second primary blank.

46. A method of making a case for holding an optical disc as defined by claim 44, wherein the peripheral area of the sixth panel of the folded second primary blank defines a spacer situated between the fifth panel of the folded second primary blank and the first panel of the folded first primary blank; and wherein the method further comprises the step of:

removing the second U-shaped cutout portion of the folded second primary blank from the sixth panel of the folded second primary blank to define an opening for receiving at least partially therein an optical disc, the opening being at least partially surrounded by the peripheral area of the sixth panel of the folded second primary blank defining the spacer.

\* \* \* \* \*